United States Patent [19]

Ohmori et al.

[11] Patent Number: 5,384,757
[45] Date of Patent: Jan. 24, 1995

[54] MAGNETO-OPTICAL DISC RECORDING AND/OR REPRODUCING APPARATUS

[75] Inventors: Kiyoshi Ohmori, Kanagawa; Yoshitaka Aoki, Tokyo, both of Japan

[73] Assignee: Sony Corporation, Japan

[21] Appl. No.: 778,401

[22] Filed: Oct. 17, 1991

[30] Foreign Application Priority Data

Oct. 22, 1990 [JP] Japan .................. 2-281828

[51] Int. Cl.⁶ ............................. G11b 13/04
[52] Int. Cl. ......................... 369/13; 369/75.2
[58] Field of Search......... 369/13, 75.1, 75.2, 77.1, 77.2 369/78, 79; 360/114, 99.2 105, 106, 107, 109

[56] References Cited

U.S. PATENT DOCUMENTS

| | | | |
|---|---|---|---|
| 5,060,207 | 10/1991 | Kaneda et al. | 369/13 |
| 5,122,998 | 6/1992 | Mizuno et al. | 369/13 |
| 5,123,004 | 6/1992 | Arai | 369/75.2 |
| 5,202,863 | 4/1993 | Miyatake et al. | 369/13 |
| 5,224,079 | 6/1993 | Inoue | 369/13 |
| 5,226,024 | 7/1993 | Mukawa | 369/13 |

FOREIGN PATENT DOCUMENTS

0387047A3 9/1990 European Pat. Off. .

OTHER PUBLICATIONS

Patent Abstracts of Japan, vol. 14, No. 98 (P-1011)(4041), 22 Feb. 1990 & JP-A-13 03 654 (Ricoh).
Patent Abstracts of Japan, vol. 10, No. 127 (P-455)(2184), 13 May 1986 & JP-A-60 251 541 (Matsushita).
Patent Abstracts of Japan, vol. 14, No. 402 (P-1099)(4345), 30 Aug. 1990 & JP-A-21 54 301 (Mitsubishi).
Patent Abstracts of Japan, vol. 8, No. 252 (P-314(1689), 17 Nov. 1984 & JP-A-59 121 647 (Toshiba).

Applied Optics, vol. 25, No. 4, Feb. 1986, New York, US, pp. 483–489; Ojima et al.: "Compact magnetooptical disk for coded data storage".
Proceedings of the International Society for Optical Engineering, vol. 1078, 17–19 Jan. 1989, Los Angeles, US; T. Murakami et al.: "Full–height magneto–optic rewritable disk drive," pp. 230–238.

Primary Examiner—Robert J. Pascal
Assistant Examiner—Tan Dinh
Attorney, Agent, or Firm—Limbach & Limbach

[57] ABSTRACT

A magneto-optical disc recording and/or reproducing apparatus comprises a disc cartridge loading portion on which a disc cartridge to housing an magneto-optical disc is loaded; a disc rotary drive means for rotating the magneto-optical disc; an optical pickup which is moved in a radial direction of the magneto-optical disc for recording and/or reproducing information signals on and from the magneto-optical disc; magnetic field generating means which is disposed in a position opposite to the optical pickup with respect to the magneto-optical disc and is moved in a radial direction of the magneto-optical disc in synchronization with the movement of the optical pickup in a radial direction of the magneto-optical disc for recording informational signals on the magneto-optical disc together with the optical pickup; lifting means for moving the magnet field generating means perpendicularly toward and away from the surface of the magneto-optical disc; loading means for loading the disc cartridge upon the cartridge loading portion and for loading the magneto-optic disc housed in the disc cartridge on the disc rotary drive means, such that magnetic field generating means is moved from a position remote from the magneto-optical disc to a position close to the magneto-optical disc by the lifting means in association with the loading operation of the disc cartridge on the cartridge loading portion by the loading means.

4 Claims, 18 Drawing Sheets

MAGNETO-OPTICAL DISC RECORDING AND/OR REPRODUCING APPARATUS

BACKGROUND OF INVENTION

1. Field of the Invention

The present invention relates to a recording and/or reproducing apparatus for recording informational signals on a magneto-optical disc and/or reproducing the recorded informational signals from the magneto-optical disc.

2. Prior Art

Optical discs which are capable of writing and reading informational signals and used as recording media for informational signals have heretofore been proposed.

Such a magneto-optical disc has a recording layer made of a magnetic thin film which can be perpendicularly magnetized. To record information, the signal recording layer is heated to a temperature higher than the Curie temperature by irradiation with a laser beam and the direction of magnetization is reversed by the application of an external magnetic field. To read recorded information, the signal recording layer is irradiated with a linearly polarized flux of lights such as a laser beam to detect the change in the direction of polarization due to Kerr's effect which occurs on deflection of the flux of lights on the surface of the signal recording layer so that differences in the direction of magnetization are read.

In order to perform writing and/or reading of the informational signals on and/or from such a magneto-optical disc, a magneto-optical disc In order to perform writing and/or reading of the informational signals on and/or from such a magneto-optical disc, a magneto-optical disc recording and/or reproducing apparatus comprising an optical pickup device and a magnetic head device including a magnetic head for applying an external magnetic field are used.

The optical pickup device is formed so that it irradiates one main side of the magneto-optical disc with a converged laser beam and detects the reflected light of the laser beam from the magneto-optical disc.

On the other hand, the magnetic head device is formed so that it applies a magnetic field on the magneto-optical disc from one side thereof which is opposite to the side irradiated with the laser beam.

Writing and/or reading of the informational signals on and/or from the surface of the magneto-optical disc is achieved by rotating the magneto-optical disc and by moving an optical pickup device and the magnetic head along the magneto-optical disc in a radial direction of the disc in synchronization with each other.

The magneto-optical recording and/or reproducing apparatus which uses a magneto-optical disc as a recording medium is formed so that a recording or erasing operation of information signals is achieved with a thermal energy of a laser beam impinged upon the magneto-optical disc from the optical pickup device and a bias magnetic field applied upon the magneto-optical disc from the magnetic head which is an external magnetic field generator.

In the magneto-optical recording and/or reproducing apparatus which performs the foregoing operation, the external magnetic field generating device for applying the external magnetic field upon the magneto-optical disc is not used except in the case in which recording and erasing of the informational signals on and from the disc is performed. Therefore, it is preferable that the external magnetic field generating device be positioned outside of the locus of loading the disc on the disc cartridge during the loading and unloading operation of the magneto-optical disc. A similar placement is desirable when loading and unloading the disc cartridge upon and from the recording and/or reproducing apparatus which requires that the external magnetic field generating device be moved to a given position, that is, a position close to the magneto-optical disc in association with completion of the loading operation.

An option may be considered that the foregoing moving operation of the external magnetic field generating device is realized by a switch which is turned on and off in response to the lifting operation of the cartridge holder for holding the disc cartridge to load the same and a moving mechanism which is initiated to start the driving by the switch.

However, if a mechanism for moving the external magnetic field generating device, the drive of which is a initiated by a switch which is turned on or off in association with the lifting operation of the cartridge holder, is separately provided to control the movement of the external magnetic field generating device, the moving mechanism becomes more complicated, and ultimately results in a more complicated recording and/or reproducing apparatus.

OBJECTS AND SUMMARY OF THE INVENTION

It is an object of the present invention to provide a magneto-optical disc recording and/or reproducing apparatus in which an external magnetic field generating device can be moved toward and away from a magneto-optical disc without a separate mechanism for moving the external magnetic field generating device.

It is another object of the present invention to provide a' magneto-optical disc recording and/or reproducing apparatus in which an external magnetic field generating device can be moved toward and away from the magneto-optical disc in association with the loading and loading operation of a cartridge disc on and from a cartridge loading portion by a loading and unloading mechanism.

It is a further object of the present invention to provide a magneto-optical disc recording and/or reproducing apparatus in which a mechanism for moving an external magnetic field generating device toward and away from a magneto-optical disc is simplified.

In order to accomplish the above mentioned objects, the present invention provides a magneto-optical disc recording and/or reproducing apparatus comprising a disc cartridge loading portion on which a disc cartridge housing a magneto-optical disc is loaded, a disc rotary drive means for rotating the magneto-optical disc, an optical pickup which is moved in a radial direction of the magneto-optical disc for recording and/or reproducing informational signals on and from the magneto-optical disc, magnetic field generating means which is disposed in a position opposite to the optical pickup with respect to the magneto-optical disc and is moved in a radial direction of the magneto-optical disc in synchronization with the movement of the optical pickup in a radial direction of the magneto-optical disc for recording informational signals on the magneto-optical disc together with the optical pickup and lifting means for moving the magnetic field generating means perpendicularly toward and away from the surface of the magneto-optical disc. Loading means mechanically connected to the lifting means load the disc cartridge upon the cartridge loading portion and load the magneto-optic disc housed in the disc cartridge upon the disc rotary drive means.

In particular, the loading means causes the lifting means to move the magnetic field generating means from a position remote from the magneto-optical disc to a position closely adjacent to the magneto-optical disc in association with the loading operation of the disc cartridge upon the cartridge loading portion by the loading means. This removes the necessity for complex electromechanical arrangements for moving the magnetic field generating means toward and away from the magneto-optical disc during loading and unload of the disc cartridge.

Other objects, features and advantages of the present invention will be apparatus from the following description of embodiments taken in connection with the accompanying driving.

BRIEF DESCRIPTION OF THE DRAWINGS

FIG. 5(A) is a plan view of this apparatus;

FIG. 5(B) is a right side elevational view of this apparatus;

FIG. 5(C) is a left side elevational view of this apparatus; FIG. 5 (D) is a front view of this apparatus;

FIG. 6(A) is a plan view showing the engagement of the disc cartridge with a misinsertion preventing pin;

FIG. 6(B) is a plan view showing the engagement of the disc cartridge with the shutter opening pin;

FIG. 6(C) is a cross-sectional view showing the insertion of the shutter opening pin;

FIG. 6(D) is a longitudinal sectional view showing the insertion of the shutter opening pin;

FIG. 6(E) is a plan view showing the engagement of the disc cartridge with an eject plate holding lever rotating pin;

FIG. 6(F) is a cross sectional view showing the opening of a shutter member with the shutter opening pin;

FIG. 6(G) is a plan view showing the retraction of the disc cartridge.

FIG. 7(A) is a plan view of this apparatus;

FIG. 7(B) is a right side elevational view of this apparatus;

FIG. 7(C) is a left side elevational view of this apparatus;

FIG. 7(D) is a front view of this apparatus;

FIG. 8(A) is a perspective view showing the lower side of the disc cartridge.

FIG. 8(B) is a perspective view showing the upper side of the disc cartridge;

FIG. 10(A) is a perspective view showing the magnetic head device holding mechanism on ejection;

FIG. 10(B) is a perspective view showing the magnetic head device holding mechanism on loading.

FIG. 10(C) is a plan view showing the magnetic head device holding mechanism on loading.

DETAILED DESCRIPTION OF THE PREFERRED EMBODIMENT

Embodiments of the present invention will be described with reference to drawings.

Prior to detailed description of the structure of an optical disc recording and/or reproducing apparatus of the present invention, the disc cartridge which is used for this apparatus as a recording medium will be described.

Figure 8A:
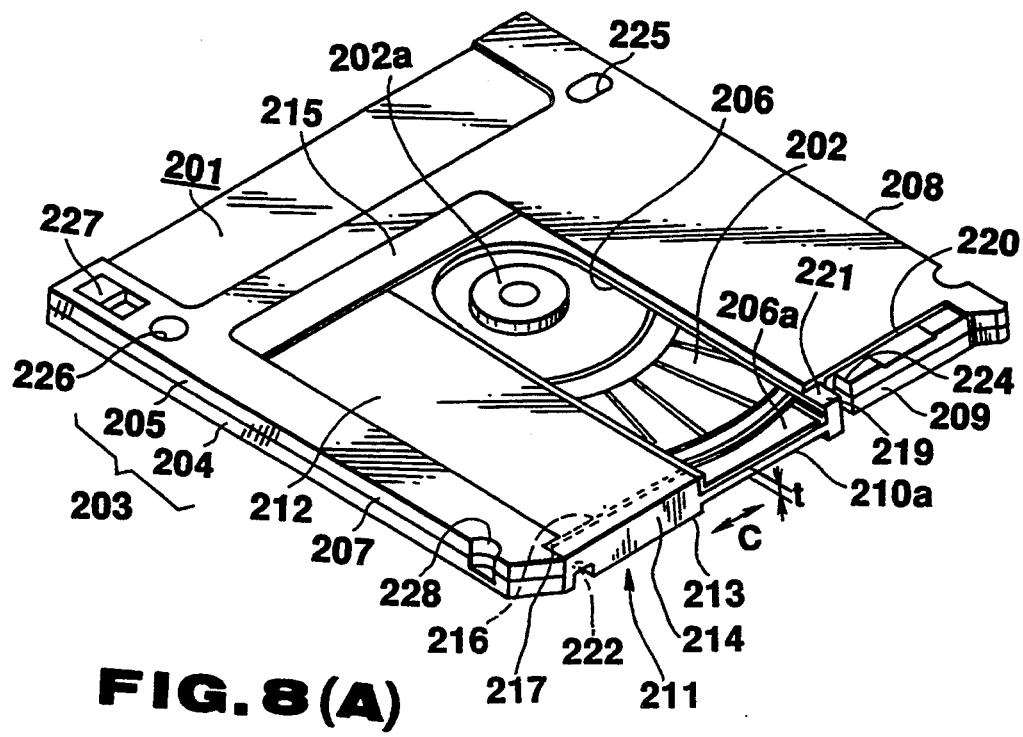
FIGS. 8(A) to 8(B) show the disc cartridge loaded on this apparatus.
Figure 8B:
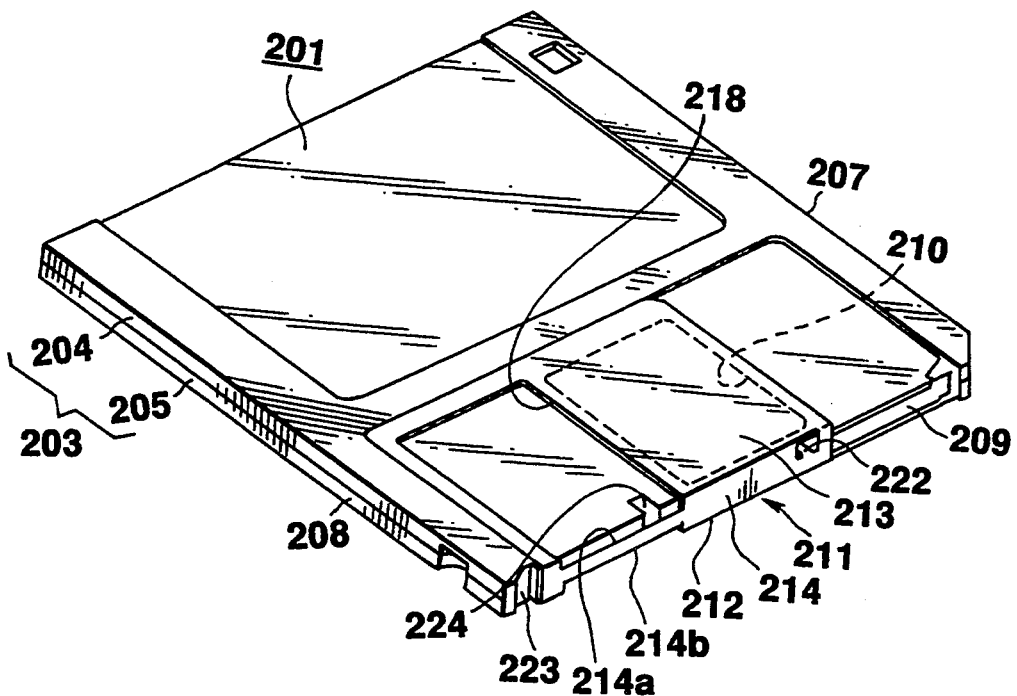

This disc cartridge 201 comprises a disc like optical disc 202 and a cartridge 203 which houses the optical disc 202 in such a manner that it is rotatable therein as shown in FIGS. 8(A) and 8(B).

The optical disc 202 has a recording layer on at least one side thereof. Writing and/or reading of informational signals is achieved on the recording layer by optical or magneto-optical means. The optical disc 202 is provided with a chucking hub 202a for chucking the optical disc 202 thereon by an optical disc recording and/or reproducing apparatus in the center thereof. The optical disc 202 in the embodiment is formed as a magneto-optical disc using a magnetic thin layer as the recording layer.

The cartridge 203 comprises a pair of upper and lower halves 204 and 205 which are formed into a rectangular shape having such a size that the optical disc 202 may be housed therein. The upper and lower halves 204 and 205 are abutted with each other so that they are united. The optical disc 202 is rotatably housed in the cartridge 203.

The lower half 205 which forms a part of the cartridge 203 is formed with the chucking hub 202a in the center thereof and with a first opening 206 through which a part of the signal recording surface of the optical disc 202 housed in the cartridge 203 is externally exposed to the outside in a radial direction. The first opening 206, formed as an elongated hole, is located between the one side 207 and the other side 208 of the cartridge 203 and extends from the front side to the center of the cartridge 203. A disc table of a disc rotary drive apparatus for rotating the optical disc 202 and a optical pickup device for irradiating the signal recording surface of the optical disc with a laser beam face the first opening 206 when the disc cartridge 201 is loaded upon the recording and/or reproducing apparatus.

On the other hand, the upper half 204 is formed with a second opening 210 in a position which is opposite to the first opening 206 formed on the lower half 205. The second opening 210 is provided in a position offset to the front side 209 of the cartridge 203 and is formed into a rectangular shape having such a size that a part of the signal recording surface of the optical disc 202 is exposed outside in a radial direction thereof. A magnetic head faces the exposed signal recording surface of the optical disc 202 housed in the cartridge 203 through the second opening 210. The front side 209 of the cartridge 203 is formed with notching recesses 206a which enables the magnetic head and the optical pickup device to move toward and away from the signal recording surface of the optical disc 202 in a close relationship with each other in the positions corresponding to the first and second openings 206 and 210, respectively. Accordingly, the front side of the cartridge 203 is made thinner in the positions corresponding to the openings 206 and 210.

A shutter member 211 which closes the first and second openings 206 and 210 is slidably mounted upon the cartridge 203. The shutter member 211 comprises a first shutter portion 212 which closes the first opening 206 of the lower half 205 and a second shutter portion 213 which closes the record opening 210 of the upper half 204 and a linking member 214 which links the first and second shutters 212 and 213.

The first shutter portion 212 is formed into an elongated rectangular shape having a narrow width which is enough to close the first opening 206 of the lower half 205 as shown in FIG. 8(A). The first shutter portion is formed on the tip end side thereof with a hinge biasing portion (not shown) which is bent and is biased by a shutter pressing plate 215 provided in the over side of the lower half 205 for preventing the first shutter portion 212 from lifting up. A first engagement piece 217 which is engaged with a first slide guide groove 216 grooved on the outer side of the lower half 205 is formed on one side of the first shutter portion in the vicinity of the linking piece 214 so that it extends toward the second shutter portion 213.

On the other hand, the second shutter portion 213 is formed into a rectangular shape having a width which is enough to close at least the second opening 210 as shown in FIG. 8(B). The second shutter portion 213 is provided with a rectangular notching hole 218 through which the second opening 210 is opened when the shutter member 211 is moved in a direction to open the first and second openings 206 and 210.

The linking piece 214 which links the first shutter portion 212 to the second shutter portion 213 is formed with a width which is equal to the thickness of the cartridge 203 in the front side 209. The linking piece 214 plays a role to stably slide the shutter member 211 by sliding along the front side of the cartridge 203. The linking piece 214 is provided with notches 214a and 214b through which the notching recesses 206a and 210a formed on the upper and lower halves 204 and 205 in the positions corresponding to the openings 206 and 210 respectively are opened when the shutter member 211 is moved so that the first and second openings 206 and 210 provided on the cartridge 203 are opened. Accordingly, the narrowed portion of the linking piece 214 which is provided with the notches 214a and 214b serves to facilitate the movement of the magnetic head and the optical pickup device toward the optical disc in a close relationship with each other. The notching recess 214a of the recesses 214a and 214b is continuous to the notching hole 218 of the second shutter portion 213.

A shorter slide guide 219 which extends in the same direction as the first shutter portion 212 is formed on one side of the linking piece 214 in which the first shutter portion is provided in a position offset to the sliding direction of the linking piece 204. At the tip end of the slide guide 219, there is provided a second engaging piece 221 which is engaged with a second slide guide groove 220 grooved on the outer side of the lower half 205 in parallel with the first slide guide groove 216 is bent toward the second shutter portion 213. Accordingly, the shutter member 221 is restricted to move in a slide direction and is prevented from being removed from the cartridge by the engagement between the first and second engagement pieces 217 and 221 and the first and second slide guide grooves 216 and 220, respectively.

The linking piece 214 is provided with a spring stopper 222 which secures one end of a torsional coil spring (not shown) disposed in the cartridge 203 for normally biasing the shutter member 211 mounted on the cartridge 203 in such a direction that the member 221 closes the first and second openings 206 and 210. The spring stopper 222 is bent inwardly in substantially parallel with the first and second shutter portions 212 and 213 and has a tip end to which the torsional coil spring is secured to the corner portion on the front side 209 of the cartridge 203 at the other end thereof. Therefore, shutter member 261 is moved in a direction represented by an arrow C in FIG. 8(A) between a position in which the first and second openings 206 and 210 are closed and a position in which the openings 206 and 210 are opened.

The cartridge 203 is formed on the front side thereof with a recess 223 into which a shutter opening pin of a shutter releasing lever disposed on the side of the recording and/or reproducing apparatus for moving the shutter member 211 against the biasing force of the torsional coil spring in such a direction that the shutter member 211 closes the openings 206 and 210 formed on the cartridge 203. The shutter opening member inserting recess 223 is provided so that the corner of one side of the cartridge 203 corresponds to one side of the linking plate 214 when the shutter member 211 closes the openings 206 and 210.

The cartridge 203 is formed on the front side 209 with the shutter opening member insertion portion 224 which keeps a condition in which the shutter member 221 is moved by the shutter opening pin of the shutter releasing lever. The shutter opening member insertion portion is formed as a notching recess in a position in which one side edge of the linking piece 214 of the shutter member 211 is located when the openings 206 and 210 are opened.

The lower half 205 which constitutes the cartridge 203 is provided with a pair of positioning pin engaging holes 225 and 226 which receive positioning pins for positioning the horizontal loading positions of the disc cartridge 201 when the disc cartridge 201 is loaded in the recording and/or reproducing apparatus. A misrecording prevention member 227 which selects either one of permission or prohibition of writing informational on the optical disc 202 is mounted on the lower half 205 in the vicinity of one of the positioning pin engaging holes 226. Cartridge retracting pin insertion holes 228 into which disc cartridge retracting pins provided on a loading mechanism of the recording and/or reproducing apparatus for loading the cartridge thereon are formed on sides of the cartridge 203 in the vicinity of the front side 209.

The optical disc recording and/or reproducing apparatus which uses the thus formed disc cartridge 201 as a recording medium will be described.

Figure 1:
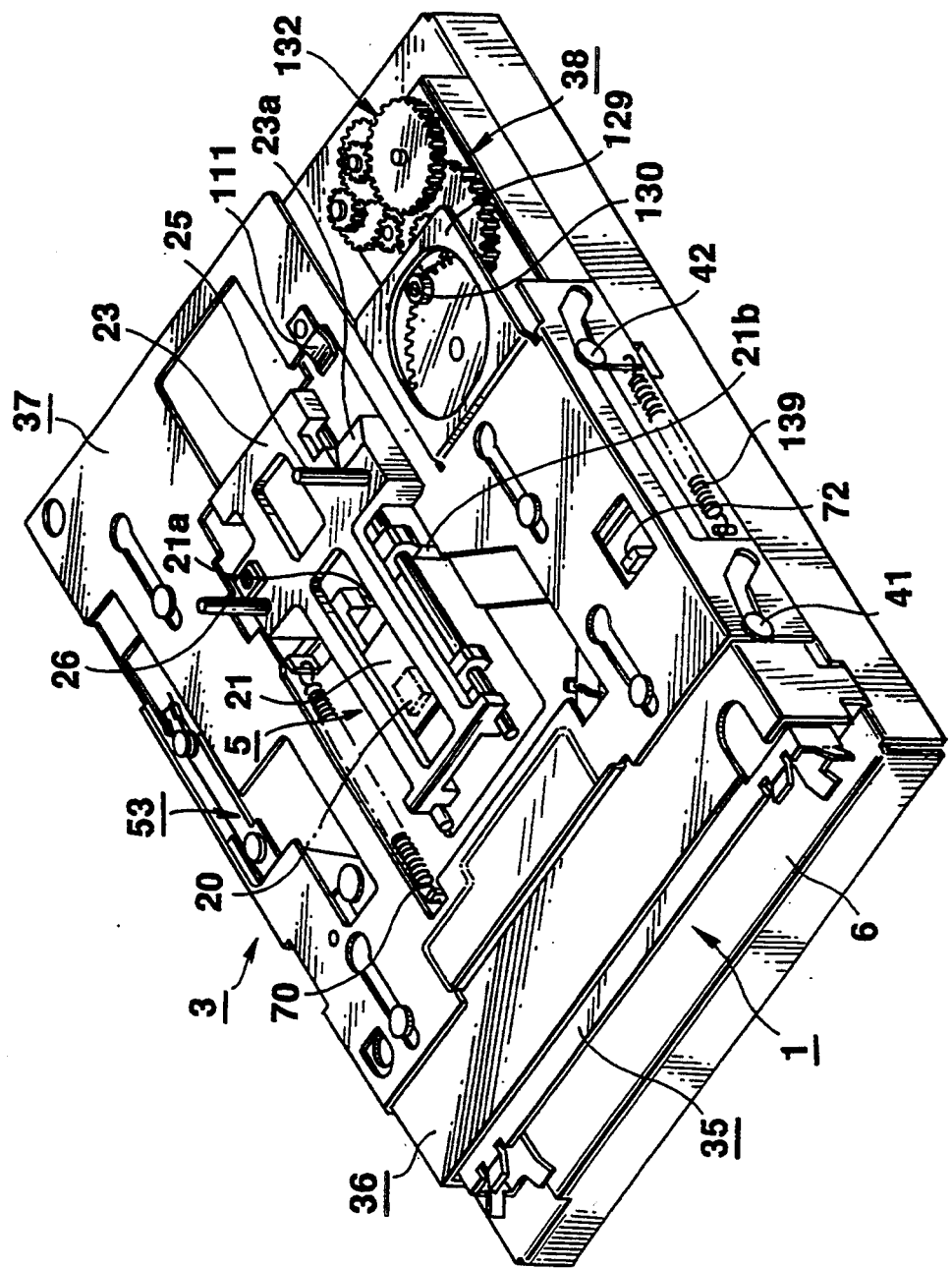
FIG. 1 is a perspective view showing the appearance of a magneto-optical disc recording and/or reproducing apparatus of the present invention.

The disc recording and/or reproducing apparatus, shown in FIG. 1, comprises a mechanism and means for loading the disc cartridge 201 (not shown) thereon so that the apparatus houses the cartridge therein and for performing recording and/or reproducing of informational signals on and/or from the optical disc 202. In other words, the apparatus comprises a disc loading mechanism 3 which leads the disc cartridge 201 on the cartridge loading portion and loads the optical disc 202 on a disc table of a disc rotary driving device 2, an optical pickup device 4 (not shown) which is moved in a radial direction along and on the optical disc 202 which is loaded on the disc table and is rotated for recording and/or reproducing the informational signals on and/or from the optical disc 202, a mechanism for recording and/or reproducing the informational signals on and/or from the optical disc 202, such as a magnetic head for applying an external magnetic field on the optical disc 202 to record the informational signals.

As shown in FIGS. 1–3(B), the cartridge loading portion 1 is formed on a chassis base 6 in which mechanisms of the disc rotary driving apparatus 2 and the optical pickup device 4 are disposed. The cartridge loading portion 1 is formed so that a space in which the disc cartridge 201 is loaded is formed on the upper side of the chassis base 6. The disc cartridge positioning pins 7 and B (not shown) engage with the positioning pin engaging holes 225 and 226 provided on the disc cartridge 201 and formed on the cartridge loading portion 1. When the disc cartridge 201 is loaded on the cartridge loading portion 1, the disc cartridge positioning pins 7 and 8 are engaged with the positioning pin engaging holes 225 and 226 so that the disc cartridge 201 is positioned on the loading portion in place. The cartridge loading portion 1 is provided with height reference pins 7a and 8a for maintaining the disc cartridge 201 in a given height relative to the chassis base 6.

Figure 7:
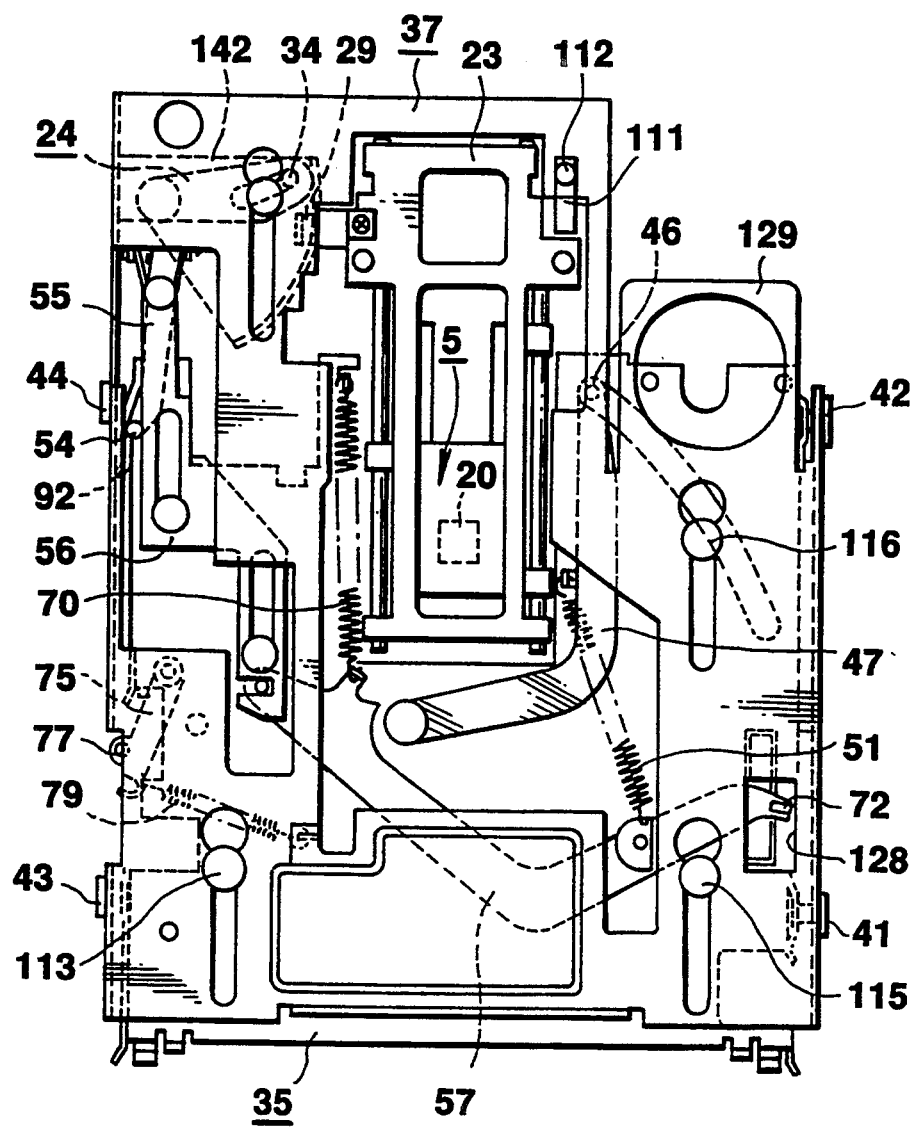
FIGS. 7(A) to 7(D) show the loading condition of this apparatus.
Figure 7B:
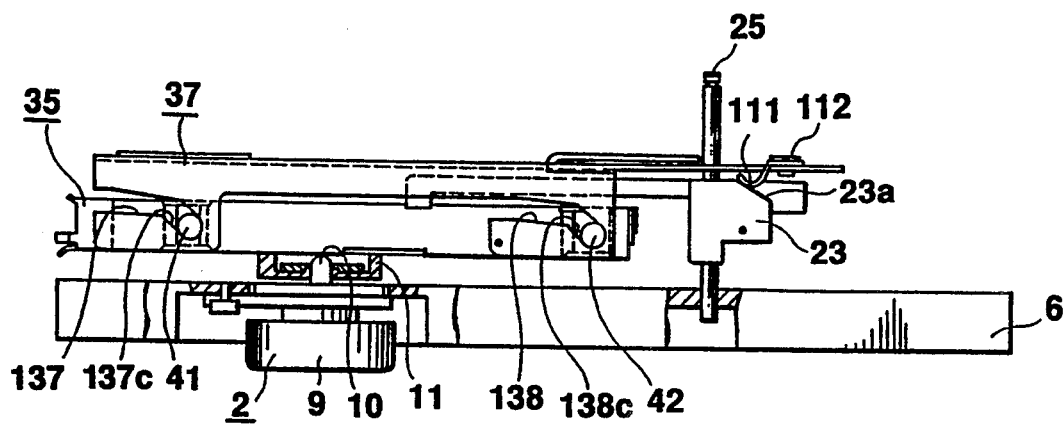
Figure 7C:
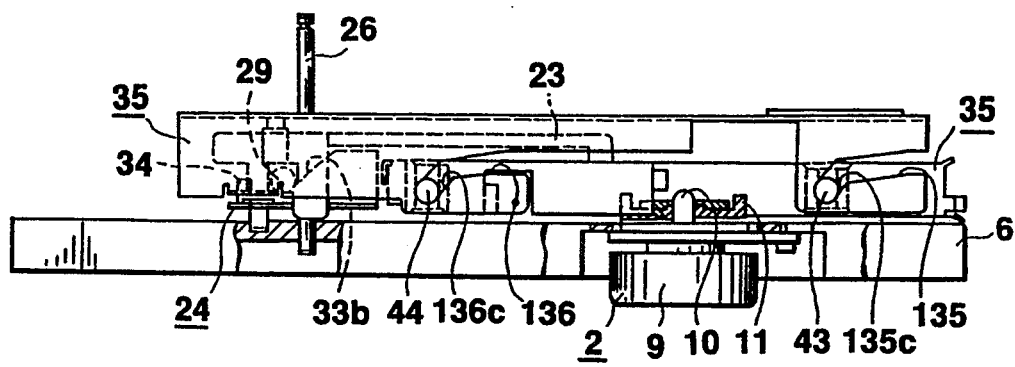
Figure 7D:
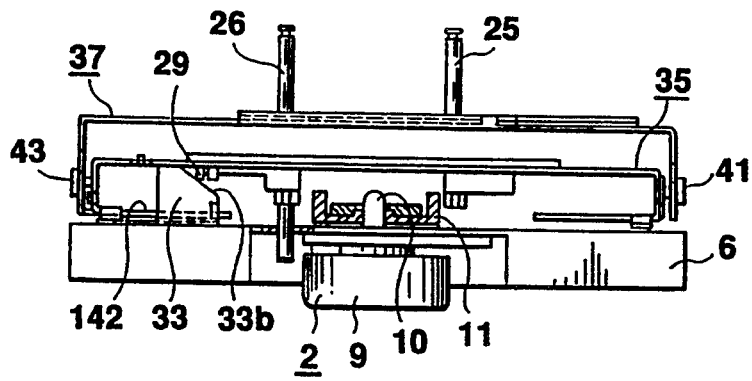

The disc rotary driving device 2, shown in FIGS. 7(B)–7(D), for rotating the optical disc 202 of the disc cartridge loaded on the cartridge loading portion 1 is disposed in the substantial center of the chassis base 6 on which the cartridge loading portion 1 is formed. The disc rotary driving device 2 has a driving motor 9 mounted on the lower side of the chassis base 6 so that a spindle shaft 10 of the motor 9 projects toward the side of the cartridge loading portion 1. A disc table 11 for rotating the optical disc 202 is integrally mounted on the tip end of the spindle shaft 10. The disc table 11 may be integral with the optical disc 202 and is capable of rotating the disc table 11. Accordingly, a magnet 12 for attracting the optical disc 202 to the disc table 11 is disposed on the disc table 11.

The optical pickup device 4 is supported on the chassis base 4a via a pair of feeding guide shafts 15 and 16 which extend across an optical pickup device loading hole 14 formed in the substantial center of the chassis base 6 so that an objective lens 13 for converging a laser beam faces to the signal recording surface on the optical disc 202 loaded on the disc table 11. The thus supported optical pickup device 4 is moved above the optical disc in a radical direction thereof along the feeding guide shafts 15 and 16 by a so-called linear motor comprising a pair of optical pickup device driving magnets 17 and 18 and a drive coil which are disposed in the optical pickup device loading hole 14.

Figures 2A, 2B:
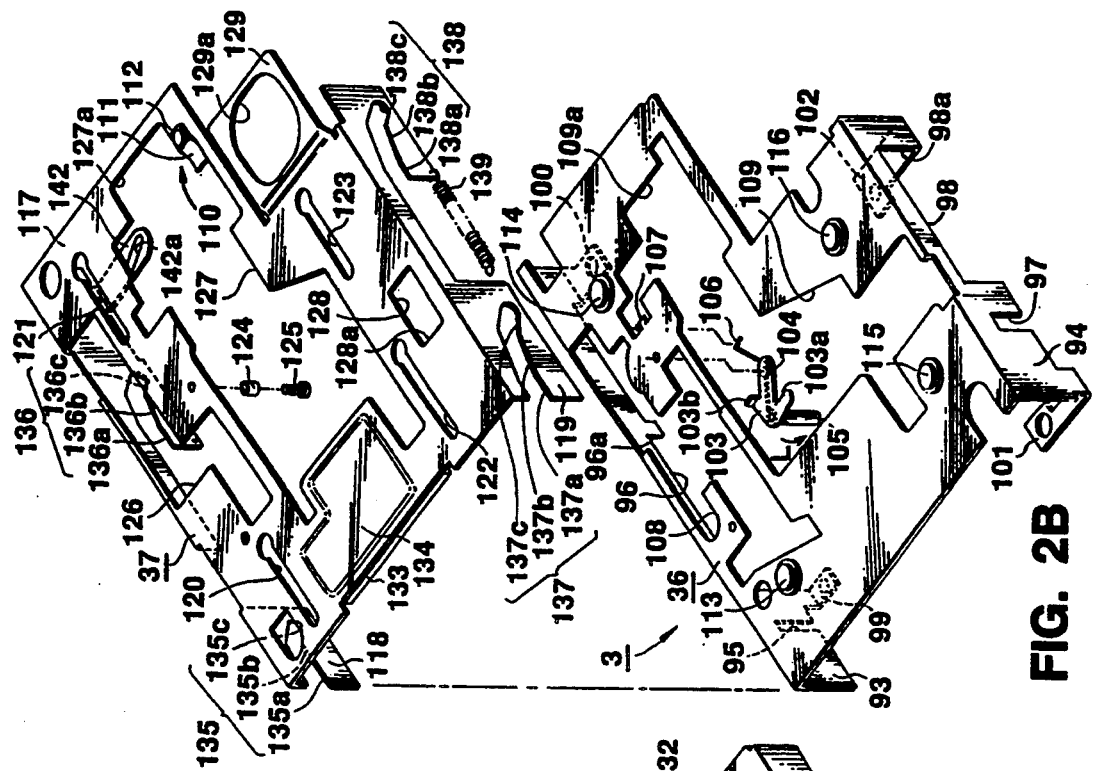
FIGS. 2A and 2B is an exploded perspective view of this apparatus.
Figure 3A:
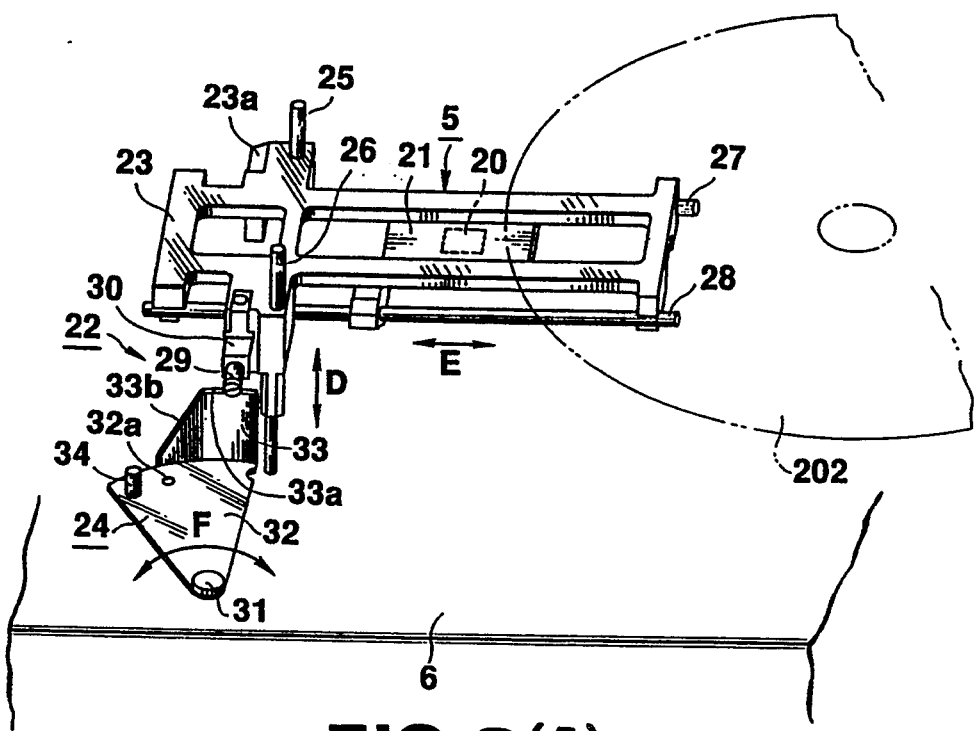
FIG. 3(A) is a perspective view showing a mechanism for vertically moving a magnetic head device when a disc cartridge is ejected.

The optical pickup device 4 is linked with the magnetic head device 5 which is moved along the optical disc 202 in a radial direction thereof in synchronization with the optical pickup device 4. The magnetic head device 5 has a magnetic disc 20 which includes a magnetic field generating coil for applying a magnetic field having a given strength upon the signal recording surface of the optical disc 202 as shown in FIG. 3(A). The magnetic head 20 is provided on a magnetic head moving frame member 21 which is movably mounted on a magnetic head lifting frame member of a mechanism for moving the magnetic head upward on downward which will be described hereafter. The magnetic head moving frame member 21 is provided with a drive portion (not shown) for moving the magnetic head along the optical disc 202 in a radial direction thereof and a distance sensor (not shown) for finely adjusting the spacing between the magnetic head 20 and the optical disc 202 to a constant value. The magnetic head moving frame member 21 is also provided with a pair of linking members 21a and 21b which depend downward toward the optical pickup device 4 as shown in FIG. 2A so that the lower ends of the members 21a and 21b are linked with the optical pickup device 4. Accordingly, the magnetic head device 5 is always moved along the optical disc 202 in a radial direction thereof in synchronization with the optical pickup device 4.

The thus formed magnetic head device 5 is moved to and away from the signal recording surface of the optical disc 202 in a substantially vertical direction by means of the mechanism 22 for moving the magnetic head upward and downward. The mechanism 22 for moving the magnetic head upward and downward comprises the magnetic head device lifting frame member 23 which supports the magnetic head moving frame member 21 which is provided with the magnetic head 20 and a lever 24 for moving the magnetic head lifting frame member 23 to and away from the signal recording surface of the optical disc 202 in a substantially vertical direction.

The magnetic head lifting frame member 23 is vertically movably mounted on a pair of lifting shafts 25 and 26 erected on one side of the chassis base 6 which is opposite to the disc rotating device 2 relative to the optical pickup device 4 and is supported so that it is movable to and away from the chassis base 6 as represented by an arrow D in FIG. 3(A). A pair of support shafts 27 and 28 are mounted on the side of the magnetic head lifting frame member 23 facing the optical pickup device 4 so that the axes of the shafts 27 and 28 extend in parallel with the signal recording surface of the optical disc 202 and in a radial direction of the optical disc 202. The magnetic head moving frame member 21 is mounted on the support shafts 27 and 28 so that the member 21 is movable in an axial direction of the support shafts 27 and 28 as represented by an arrow E in FIG. 3(A), that is, in a radial direction of the optical disc 202. A lifting engagement pin 29 which is slidingly engaged with the lever 24 for vertically moving the lifting shaft 26 is provided in the vicinity of the lifting shaft 26 of the magnetic head lifting frame member 23. The lifting engagement pin 29 is mounted on the tip end of a lifting engaging pin mounting member 30 which is made of a bent metal plate which depends from one side of the magnetic head lifting frame member 23.

The lever 24 which is slidably engaged with the lifting engaging pin 29 to enable the magnetic head lifting frame member 23 to be vertically moved and mounted on the chassis base 6 so that the lever 24 is rotatable around a pivot shaft 31 in a direction of an arrow F in FIG. 3. The lever 24 for vertically moving the magnetic head lifting frame member comprises a sector like slide contact portion 32 which slidingly contacts the chassis base 6 and a vertically movable guide 33 which stands from the slide contact portion 32. The slide contact portion 32 is provided with a small projection 32a which is in a point contact with chassis base 6 to facilitate the slide contact with the chassis base 6. A lever actuating pin 34 erects on the slide contact portion 32, which is inserted into a member for actuating the lever 24 provided on an eject plate of a disc loading mechanism 3 which will be described hereafter. The lever actuating pin 34 is provided on the slide contact portion 32 at one edge of the outer periphery, thereof in which the vertical guide portion 33 is provided.

Figure 3B:
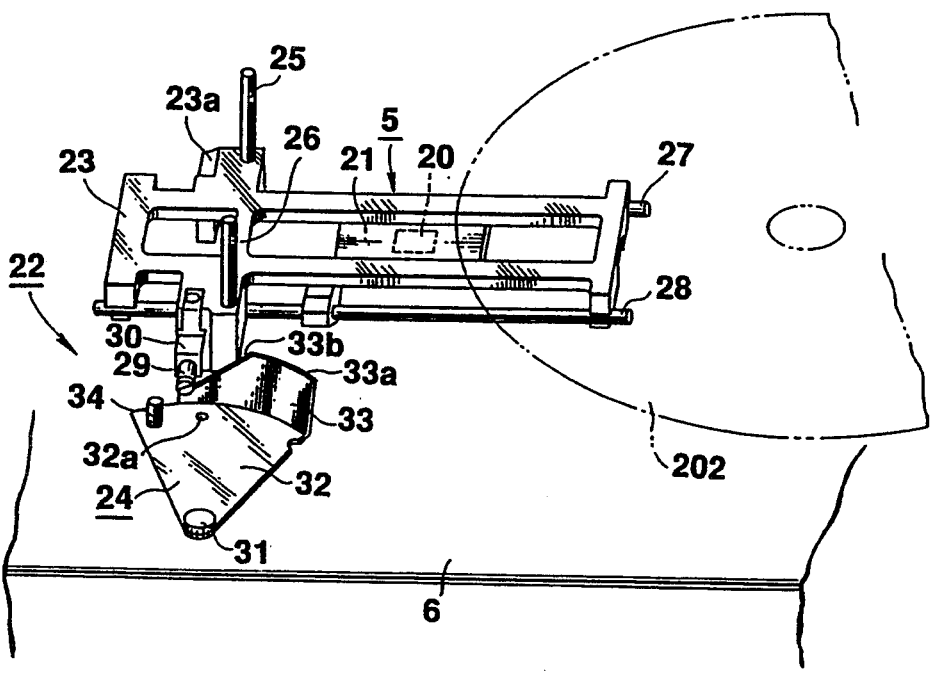
FIG. 3(B) is a perspective view showing the mechanism for vertically moving the magnetic head when the disc cartridge is loaded.

On the other hand, the vertical guide portion 33 is in a slide contact with the lifting engaging pin 29 on the upper edge of the erecting wall thereof and comprises a parallel portion 33a which is parallel with the chassis base 6 and an inclined portion 33h which is inclined from the parallel portion 33a toward the side of the lever actuating pin 34. Under a condition that the lifting engaging pin 29 is engaged with the parallel portion 33a, that is, an eject condition, the magnetic head lifting frame member 23 is moved away from the optical disc 202 as shown in FIG. 3(A). At least when the cartridge 201 is inserted, the magnetic head 20 is maintained in such a position that it will not contact the optical disc 202. In contrast, when the lifting engaging pin 29 is engaged with the lower end of the inclined portion 33b, that is, a loading condition, the magnetic head lifting frame member 23 is moved toward the optical disc 202 as shown in FIG. 3(B). The magnetic head 20 is maintained at such a level that the head 20 can record signals upon the signal recording surface of the optical disc 202.

Accordingly, the magnetic head device 5 is movably mounted on the magnetic head lifting frame member 23 and is moved along the optical disc 201 in a radial direction thereof. The lifting engaging pin 29 provided upon the magnetic head lifting member 23 is brought into a slide contact with the parallel portion 33a and the inclined portion 33b by the rotation of the lever 24 for vertically moving the magnetic head lifting frame member so that the magnetic head device is vertically moved toward and away from the signal recording surface of the optical disc 202.

In the vicinity of the other lifting shaft 25 of the magnetic head lifting frame member 23, there is provided an engaging surface 23a which is brought into an engagement with a magnetic head device holding mechanism for maintaining the magnetic head device 5 on a given level relative to the signal recording surface of the optical disc 202 when the magnetic head device 5 is moved to a recording position which is close to the optical disc 202. The engaging surface 23a provides an inclined surface which is inclined toward the chassis base 6 on the side opposite to the magnetic head device 5.

The disc loading mechanism 3 for loading the disc cartridge 201 on the cartridge loading portion 1 comprises a cartridge holder 35 into which the disc cartridge 201 loaded on the optical disc recording and/or reproducing apparatus is inserted and held therein, a cartridge holder support plate 36 which supports the cartridge holder 35, an eject plate 37 which vertically moves the cartridge holder 35 relative to the cartridge loading portion 1 and discharges the disc cartridge 201 to an eject position for discharging the cartridge 201, and an eject plate slide drive mechanism 38 for sliding the eject plate 37 as shown in FIGS. 1 and 2.

Figure 4A:
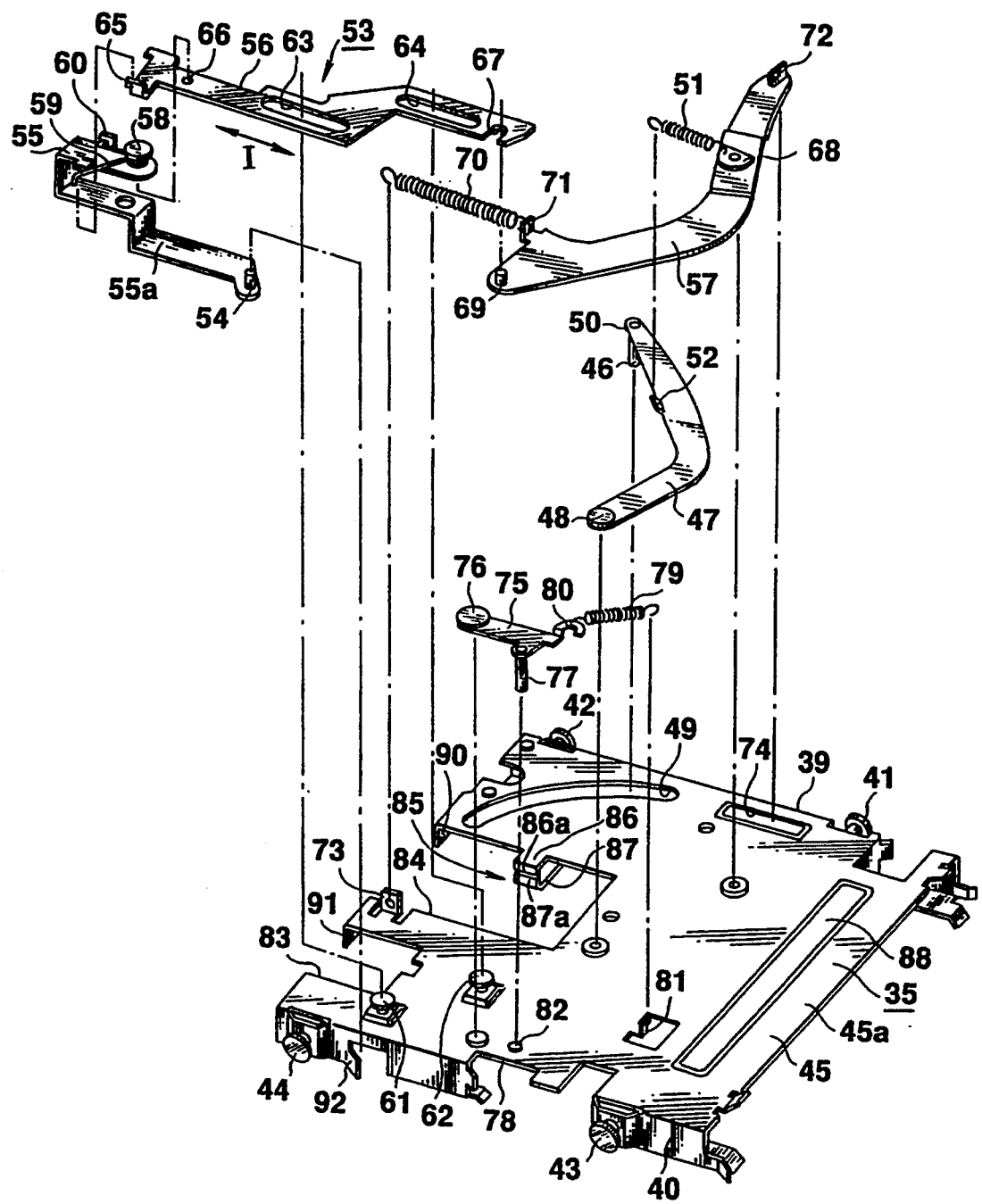
FIG. 4(A) is an exploded perspective view of a cartridge holder.
Figure 4B:
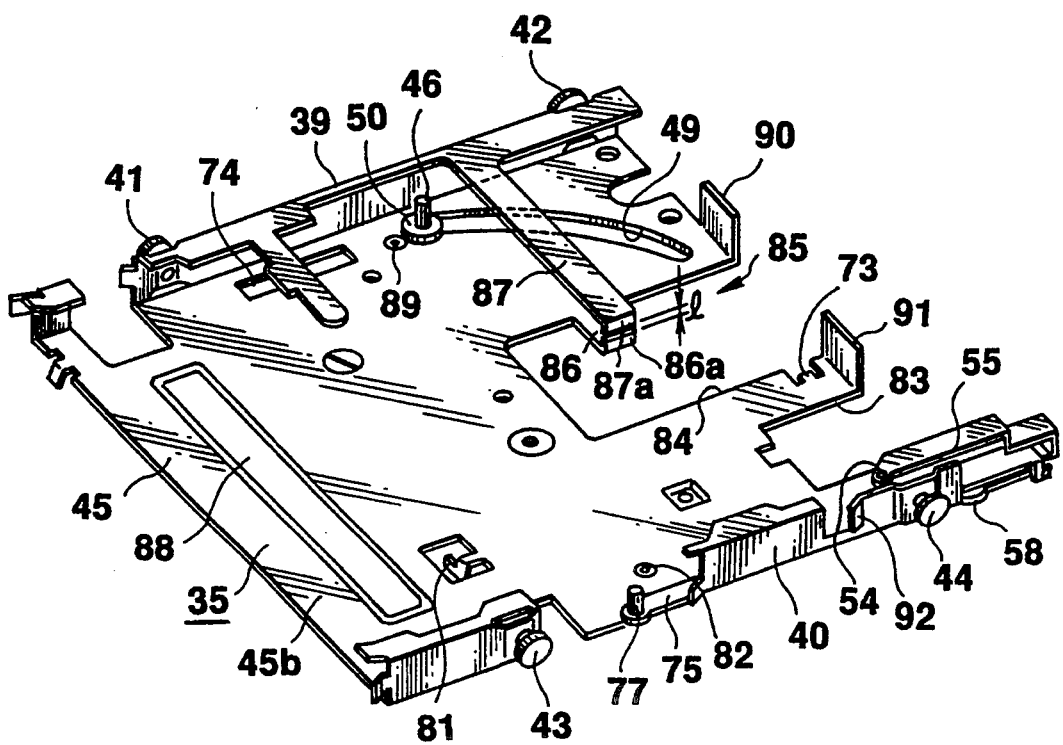
FIG. 4(B) is a perspective view showing the cartridge holder as viewed from the rear side thereof.

The cartridge holder 35 is formed into a substantially flat shape having a size enough for the disc cartridge 201 to be inserted therein as shown in FIGS. 4(A) and 4(B) and is formed with on the opposite sides thereof cartridge holding portions 39 and 40 which having substantial n section for holding the disc cartridge 201. A pair of vertical movable guide pins 41 and 42 (43 and 44) are projected from bulges on each of the outer sides of the cartridge holders 39 and 44. The vertical movable guide pins 41, 42, 43, and 44 are inserted in and engaged with the vertically moving guide grooves provided on the cartridge holder support plate 36 and the eject plate 37 which will be described hereafter.

As shown in FIG. (4)A, a shutter opening lever 47 is rotatably mounted on an upper plate portion 45a of the cartridge holder 45. The shutter opening lever 47 is provided with a shutter opening pin 46 which is inserted into and engaged with the shutter opening member inserting recess 223 of the disc cartridge 201 inserted into the cartridge holder 35. The shutter opening lever 47 is formed into a substantial L-shape in plan and is rotatably supported on the upper side 45a of the upper plate portion 45 in the center thereof by a first pivot shaft 48 at the base end thereof. A shutter opening pin 46 for opening the shutter member 211 is formed on the shutter opening lever 47 at the tip end thereof. The shutter opening pin 46 depends from the lever 47 and extends inwardly of the cartridge holder 35 through a shutter opening pin guide hole 49 formed on the upper plate 45 along a moving trace around the first pivot shaft 48. The shutter opening pin guide hole 49 is so formed so that it has a width which is slightly longer than the outer diameter of the shutter opening pin 46 to facilitate the movement of the shutter opening pin 46. The shutter opening pin 46 is provided with a member 50 for preventing the pin 46 from riding upon the shutter member 211. The shutter opening pin escapement preventing member 50 is formed as an annular washer having a size enough to cover the shutter opening pin guide hole 49, and is provided so that it is adapted on the shutter opening pin 46 and is in contact with the bottom side 45b of the upper plate portion 45. This causes the position of the shutter opening pin 46 to be restricted relative to the shutter opening pin guide hole 49 by the shutter opening bin escapement preventing member 50. The shutter opening pin 46 is smoothly movable along the shutter opening pin guide hole 49 and prevents the pin 46 from escaping in a direct normal to the axis of the hole. As a result of this, the shutter opening pin 46 is positively inserted into and engaged with the shutter opening member inserting recess 223 for opening the shutter member 211 without riding upon the shutter member 211.

The thus rotatably mounted shutter opening lever 49 is biased by a first tension coil spring 51 in such a direction represented by an arrow G in FIG. 2A that the shutter opening pin 46 is moved to the discharging opening of the disc cartridge 201. In other words, the first tension coil spring 51 is on one end secured to a first spring stopper 52 cut on the shutter opening lever 47 and the other end, is secured to a third pivot shaft (57) provided on a retracting member which will be described hereafter so that the shutter opening pin 46 is positioned on a starting end position of the shutter opening pin guide hole 45, in its initial position.

As shown in FIG. 4(A), the upper plate portion 45a of the cartridge holder 35 is provided with a disc cartridge retracting mechanism 53 which forcibly retracts the disc cartridge 201 to a loading position when the disc cartridge 201 is inserted into the cartridge holder 35. The disc cartridge retracting mechanism 53 comprises a cartridge retracting member 55 which is provided with a cartridge retracting pin 54 inserted in and engaged with a cartridge retracting pin insertion hole 228 formed on the disc cartridge 201, a cartridge retracting lever 56 which rotatably supports the cartridge retracting member 55, and a cartridge retracting actuating lever 57 for moving the cartridge retracting lever 56.

The cartridge retracting member 55 is formed so that it has a substantially π-shaped section and is formed with a substantially L-shaped extension 55a which extends toward the discharge opening of the disc cartridge 201 at the tip end of the lower end side thereof. The extension 55a is bent toward the outer side of the cartridge holding portion 40 of the cartridge holder 35 at the tip end thereof. The extension 55a is provided with the cartridge retracting pin 54 at the tip end thereof so that the pin 54 erects thereon. The thus formed cartridge retracting member 55 is rotatably mounted on the tip end of the cartridge retracting lever 56 via a second pivot shaft 58. The cartridge retracting lever 56 is biased by a first torsional coil spring 59 mounted on the second pivot shaft 58 to move the cartridge retracting pin 54 toward the outer side of the cartridge holding porting 40 of the cartridge holder 35 as represented by an arrow H in FIG. 2A. That is, the first torsional coil spring 59 has an end which is engaged with a second spring stopper 60 cut on from the cartridge retracting member 55 and the other end which is engaged with a third spring stopper piece provided on the cartridge retracting lever 56 so that the cartridge retracting pin 54 is biased to the outer side of the cartridge holding portion 40 of the cartridge holder 35.

The cartridge retracting lever 56 which rotatably supports the cartridge retracting member 55 is engaged with a pair of guide shafts 61 and 62 journalled on the upper side 45a of the upper plate portion 45a of the cartridge holder 35 and is moved in a direction of an arrow I in FIG. 4(A) to the insertion and removing opening of the disc cartridge 201 and in a direction opposite thereto. The guide shafts 61 and 62 are journalled on projections which are partially bulged portions of the upper plate portion 45. In other words, elongated moving guide holes 63 and 64 are formed in the cartridge retracting lever 56 in positions corresponding to the guide shafts 61 and 62, respectively. The guide shafts 61 and 62 are engaged with the guide holes 63 and 64 respectively so that the cartridge retracting lever 56 can be moved forwardly, and rearwardly. A third spring stopper piece 65 connects the other end of the first torsional coil spring 59 provided on the cartridge retracting member 55. A mounting hole 66 is bored on the cartridge retracting lever 56 in the vicinity of the tip end in the side of the cartridge retracting member 55. A second pivot shaft 58 is also mounted on the cartridge retracting member 55. At the other end of the cartridge retracting lever 56, there is provided an engaging hole 67 with which a moving actuating engagement pin 69 is provided on the cartridge retracting actuation lever 57 for moving the cartridge retracting lever 56.

The cartridge retracting actuating lever 57 is in the form of a substantial arc in plan and is rotatably supported on the upper side 45a of the upper plate portion 45 of the cartridge holder 35 by a third pivot shaft 68 in the substantial center of the lever 57. The cartridge retracting actuating lever 57 is provided on the side of the insertion and removing opening of the disc cartridge holder in the vicinity of the shutter opening lever 49. A moving actuator engaging pin 69 which is engaged with an engaging hole 67 of the cartridge retracting lever 56 erects on the cartridge retracting actuation lever 57 at one end thereof. A fourth spring engaging piece 71 with which a second tension coil spring 70 is engaged is formed on the lever 57. On the other hand, a rotary actuating engaging piece 72 which is engaged with the eject plate 39 is formed on the lever 57 at the other end thereof so that it erects thereon.

The thus rotatably mounted cartridge retracting actuation lever 57 is biased by the second tension coil spring 70 in such a direction as represented by an arrow J in FIG. 2A so that the lever 59 is moved toward the insertion side of the disc cartridge 201. In other words, the second tension coil spring 70 has one end which is engaged with a fourth spring engaging piece 71 of the cartridge retracting actuating lever 57 and the other end which is engaged with a fifth spring engaging piece 73 formed on the upper side 45a of the upper plate portion 45 of the cartridge holder 35 so that the rotary actuation engaging piece 72 is positioned on the side of the insertion and removing opening of the disc cartridge holder. Simultaneously with this, the cartridge retracting lever 56 which is linked with the cartridge retracting actuation lever 57 extends toward the insertion side of the disc cartridge 201 to position the cartridge retracting pin 54 of the cartridge retracting member 55 in the loading position. A tilting down preventing portion 74 prevents the rotary actuating engaging piece 72 from tilting down when the pieces rotate. The tilting down preventing portion overhangs an area of the upper plate portion 45 of the cartridge holder 35 in which the rotary actuating engaging piece 72 is rotated.

A misinsertion prevention lever 75 which prevents the disc cartridge 201 from being inserted into the cartridge holder 35 in a wrong direction is rotatably mounted on the upper plate portion 45 of the cartridge holder 35. The misinsertion prevention lever 75 is supported at the base end thereof by a fourth support shaft 76 which is positioned in the vicinity of one side of one cartridge holding portion 40 of the cartridge holder 35 so that the lever 75 is rotatable around the support shaft 76 on the upper side 45a of the upper plate portion 45 of the cartridge holder 35. A misinsertion prevention pin 77 erects at the tip end of the misinsertion prevention lever 75. The misinsertion prevention pin 77 extends downwardly into the cartridge holder 35 through a recess 78 formed in one side of the cartridge holder 35.

The thus formed misinsertion prevention lever 75 is biased by a third tension coil spring 79 inwardly of the cartridge holder 35 in a direction represented by an arrow K in FIG. 2A. That is, the third tension coil spring 79 has one end which is engaged with a sixth spring engaging piece 80 (shown on FIG. 4(A)) formed on the misinsertion prevention lever 75 and the other end which is engaged with a seventh spring engaging piece 81 formed on the upper plate portion 45 of the cartridge holder 35 so that the misinsertion prevention pin 77 is positioned inwardly of the cartridge holder 35. When the misinsertion prevention lever 75 is biased by the third tension coil spring 79, the lever abuts on a positioning projection 82 which projects from the outer periphery of the notch of the cartridge holder 35 so that the misinsertion prevention pin 77 is positioned in the initial position.

As shown in FIG. 4(A) and 4(B), the upper plate portion 45 of the cartridge holder 35 is formed with a first notch 83, to which an eject plate holding lever for holding the eject holder 35 which will be described in an eject position, faces and a second notch 84 to which the magnetic head device 5 faces. Cartridge misinsertion prevention means 85 for preventing different discs from being inserted into the disc cartridge holder is provided in the opening side of the second notch 84 of the notches 83 and 84 so that it projects inwardly of the notch 84.

Figure 9:
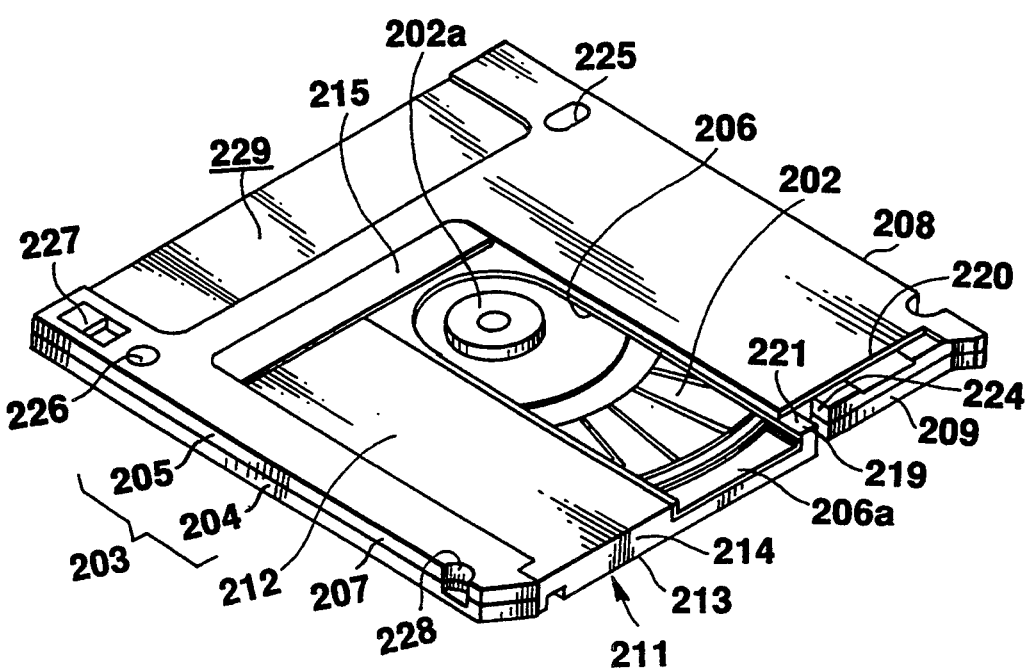
FIG. 9 is a perspective view showing the lower side of a disc cartridge which can not be loaded on this apparatus.

Referring again to FIGS. 4(A) and 4(B), the cartridge misinsertion prevention means 85 comprises a first tongue 86 formed of a part of the upper plate portion 45 of the cartridge holder 35 which projects inwardly of the second notch 84 from one side of the peripheral edge of the second notch 84 and a second tongue 87 which extends from one cartridge holding portion 39 into the second notch 84 in parallel and opposite to the first tongue 86. The first and second tongues 86 and 87 are bent at the tip ends 86 and 87a thereof so that they face each other. A gap between the tip ends 86a and 87a of the first and second tongues 86 and 87 is slightly larger than the thickness t (shown in FIG. 6(F)) of the thin walled portion of the cartridge 206 formed by notch recesses 206 and 210a of the upper and lower halves 204 and 205 of the disc cartridge 201. Accordingly, only the disc cartridge 201 which can pass through a gap between the first and second tongues 86 and 87 will be held by the cartridge holder 35. A cartridge 229 having a recess 206a only on the lower half 205 as shown in FIG. 9 or a cartridge having no recess on both upper and lower halves (not shown) will be not held in the cartridge holder 35. In other words, when a disc cartridge 229 which houses a different disc incompatible with a thin optical disc recording and/or reproducing apparatus, such as a disc cartridge 229 which houses a read-only CD-ROM and the like is inserted into this cartridge holder 35, the first tongue 86 is brought into an abutment on the linking piece 214 of the shutter member 211 having no notch formed thereon to prevent misinsertion of the disc cartridge 229. When a disc cartridge having no notch on either halves, such as a disc cartridge which houses a 3.5 inch floppy disc is inserted into the cassette holder 35, the first and second tongues 86 and 87 are brought into an abutment on the linking piece 214 of the shutter member 211 to prevent the misinsertion of the disc cartridge.

Figure 6A:
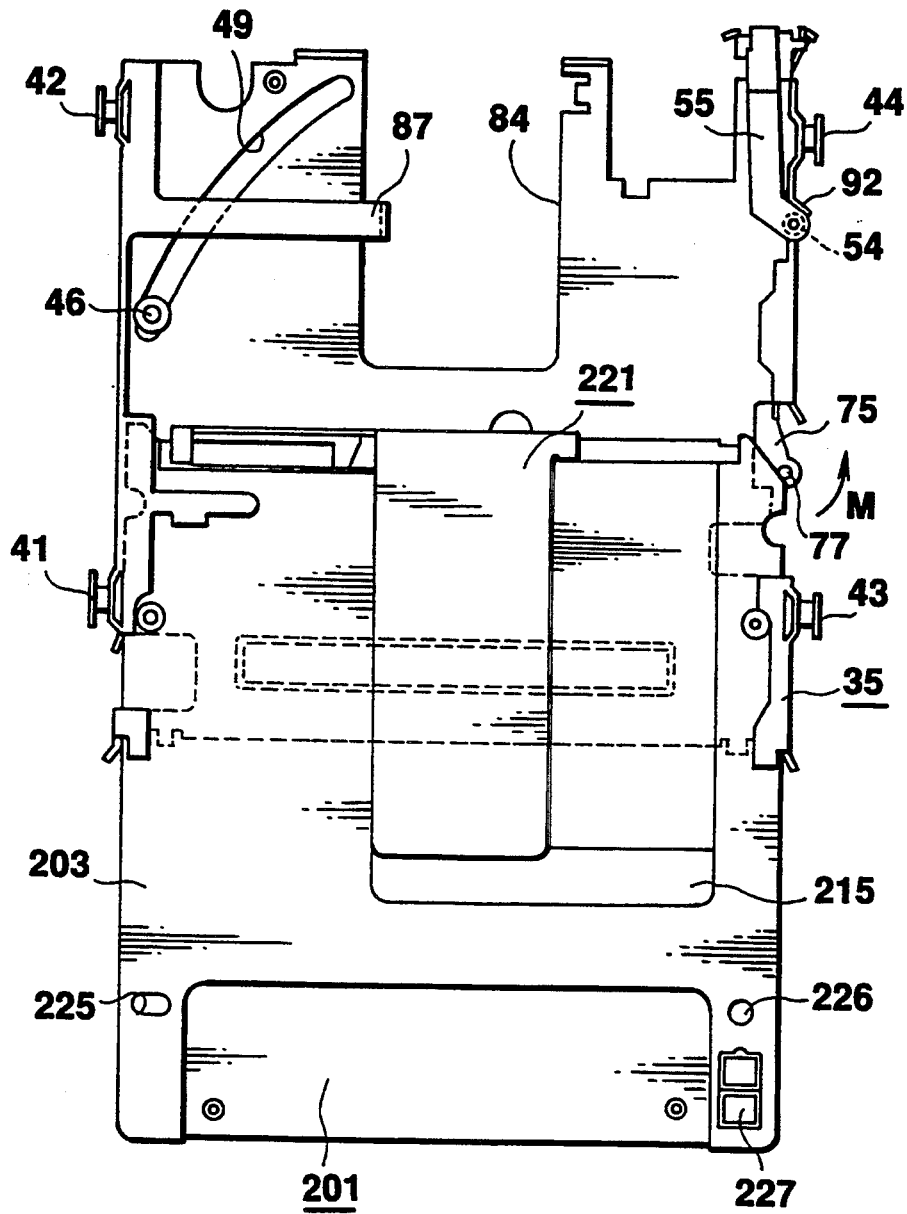
FIGS. 6(A) to 6(G) show the loading conditions of a disc cartridge on a cartridge holder.

Pins may be used in lieu of the first and second tongues 86 and 87. A pin which is a substitute of the first tongue 86 may be provided on the cartridge holder 35 and a pin which is a substitute of the second tongue may be provided on the chassis base 6. Of course, it is necessary to provide these pins so that they face each other when the shutter member 211 is in an opened position as shown in FIG. 6(E).

The upper plate portion 45a of the cartridge holder 35 is formed with a bulged portion 88 for preventing the shutter opening lever 47, the cartridge retracting actuating lever 59 or the misinsertion prevention lever 75 from abutting upon the cartridge holder support plate 36 when the cartridge holder 35 is supported by the cartridge holder support plate 36, shown in FIG. 2B. The bulged portion 88 is formed on one side of the upper plate portion 45 of the cartridge holder support plate 36 in the vicinity of the insertion and removing opening for the disc cartridge 201 and has at least a height larger than the thickness of various levers and extends in a direction normal to the insertion direction of the disc cartridge 201.

A cartridge pushing down member 89 is provided on the bottom 45b of the upper plate portion 45 of the cartridge holder 35 so that it projects from the bottom 45b. The cartridge pushing down member 89 prevents the disc cartridge 201 from riding on the shutter opening 45 pin escapement preventing member 50 provided on the shutter opening pin 46, by pushing down the disc cartridge 201 to be inserted into the cartridge holder 35. The cartridge pushing down member 89 is provided in the vicinity of the shutter opening pin 46 which is in an initial position. The member 89 is formed as a projection, the height of which is longer than at least the thickness of the shutter opening pin escapement prevention member 50 for positively preventing the disc cartridge from riding upon the shutter opening pin escapement prevention member 50.

The upper plate portion 45 of the cartridge holder 35 is provided with cartridge insertion position restricting members 90 and 91 (not shown) for restricting the insertion position so that the disc cartridge 201 to be inserted into the cartridge holder 35 will not be inserted inwardly beyond the loading position. The cartridge insertion position restricting member 90 and 91 are provided in the vicinity of the opened edge of the second notch 84 in one side of the upper plate portion 45 so that they depend downward into the cartridge holder 35.

The cartridge holder portion 40 of the cartridge holder 35 is formed on an outer side thereof with a cartridge retracting pin position restricting tongue 92 which maintains the cartridge retracting pin 54 in the initial condition when in an eject condition so that the tongue is bent in an outward direction from the side of the cartridge holder portion 40. The cartridge retracting pin position restricting tongue 92 maintains the cartridge retracting pin 54 in a position escaped outwardly not to contact the disc cartridge 201 when the pin 54 is inserted into the cartridge holder in the eject condition.

The cartridge holder support plate 36 which supports the thus formed cartridge holder 35 is formed into a substantially flat plate having a size enough to hold the cartridge holder 35 therein as shown in FIGS. 2A and 2B. The cartridge holder support plate 36 is provided on the opposite sides thereof with cartridge holder support walls 93 and 94 which vertically support the cartridge holder 35. The cartridge holder support walls 93 and 94 are provided with vertically moving guide grooves 95, 97 and 96, 98 and vertically moving guide pins 41, 42, 43 and 44 formed in the cartridge holder 35 are inserted into and slidably engaged with the vertically moving guide grooves 95–97. The grooves 95 and 97, which are provided in the side of the insertion and removing opening for the disc cartridge 201, are notched as slit grooves having a width enough through which the vertically moving guide pins 41 and 43 are inserted in parallel with a spindle shaft 10 of the disc rotary drive device 2. In contrast to this, the other vertically moving guide groves 96 and 98 have a larger width and are notched in parallel with the spindle shaft 10 of the disc rotary drive apparatus 2. The inner vertically moving guide pins 42 and 44 are engaged with the vertically moving guide grooves 96 and 98 so that they slide contact with the side edges 96a and 98a on the near side of the grooves 96 and 98, respectively. That is, the vertically moving guide pins 41 and 43 in the side of the insertion and removing opening for the disc cartridge 201 are inserted into and engaged with the opposite vertically moving guide grooves 95 and 97, respectively, while the inner vertically moving guide pins 42 and 44 are slidably engaged with the side edges 96a and 98 of the other vertically moving guide grooves 96 and 98, respectively.

The cartridge holder support walls 93 and 94 having the vertically moving guide grooves 95, 96, 97 and 98 are provided with write mounting portions 99, 100 and 101, 102 which secure the holder support plate 36 to the chassis base 6. The mounting portions 97, 100 and 101, 102 extend inwardly from the lower side of the support plate such that portions 99 and 100 extend from support wall 93 opposite from portions 101 and 102 extending from support wall 94. That is, the mounting portions 99, 100, 101 and 102 are secured to the chassis base 6 by screws so that the cartridge holder support plate 36 is firmly secured to the chassis base 6. An eject plate holding lever 103 for holding the eject plate, which will be described hereafter in an eject position against the biasing force of a tension coil spring, is rotatably mounted on the cartridge holder support plate 36. The eject plate holding lever 103 is supported by a fifth pivot shaft 104 so that the lever 103 is rotatable around the base end thereof. The eject plate holding lever 103 is provided with an engaging pawl 103a at the tip and thereof which is engaged with an eject plate engaging member provided on the eject plate 37 for holding the eject plate 37 in an eject position. An eject plate holding lever rotating pin 109 for rotating the eject plate holding lever 103 erects on the base end at which the engaging pawl is provided. The eject plate holding lever rotating pin 105 extends downward into the cartridge holder 35 through a notch 83 which opens in one side of the cartridge holder 35. The tip end of the eject plate holding lever rotating pin 105 extends downward to at least a point at which it abuts upon the disc cartridge 201 to be inserted into the cartridge holder 35.

The thus formed eject plate holding lever 103 is biased in a direction represented by an arrow L in FIG. 2B by a second torsional coil spring 106. The second torsional coil spring 106 has one end which is engaged with the base end of the eject plate holding lever rotating pin 105 and the other end which is engaged with an eighth spring engaging piece 107 formed from the cartridge holder support plate 36 so that the eject plate holding lever rotating pin 105 is biased in a direction represented by an arrow L in FIG. 2B. In a condition that the engagement between the engaging pawl 103a and the eject plate engaging member is released, the lever rotation preventing piece 103b formed on the eject plate holding lever 103 is engaged with the cartridge holder support plate 36 so that rotation of the eject plate holding lever 103 is restricted.

The cartridge holder support plate 36 is provided with a third notch 108 to which the cartridge retracting lever 56 faces, a fourth notch 105 to which the magnetic head device 5 faces, and eject plate slide pins 113, 114, 115 and 116 for sliding the eject plate 37.

The eject plate 37 is slidably secured to the thus formed cartridge holder support plate 36. The eject plate 37 comprises a flat plate-like slide portion 117 which is in slide contact with the cartridge holder support plate 36 and standing walls 118 and 119 which are provided in the opposite sides of the slide portion 117 and extend toward the disc rotating drive device 2. The slide portion 117 is provided with slide grooves 120, 121, 122 and 123 which the eject plate slide pins 113, 114, 115 and 116 provided on the cartridge holder support plate 36 are engaged with and inserted through, respectively. The slide grooves 120, 121, 122 and 123 are formed in the positions corresponding to the eject plate slide pins 113, 114, 115 and 116, respectively, as elongated holes which extend in an insertion and removing direction of the disc cartridge 201.

The slide portion 117 is provided with an eject plate engaging member 124 which is engaged with the eject plate holding lever 103 provided on the cartridge holder support plate 36. The eject plate engaging member 124 is formed into a cylinder having enough size that it can be engaged with the engaging pawl 103a of the eject plate holding lever 103. The eject plate engaging member 124 is rotatably secured to the slide portion 117 by a screw 125 which passes through a through-hole bored in the center of the cylinder.

The slide portion 117 is provided with a fifth notch 126 to which the cartridge retracting lever 56 faces, a sixth notch 127 to which the magnetic head device 5 faces, and a seventh notch 128 to which the rotary actuation engaging piece 72 of the cartridge retracting actuating lever 57 provided on the cartridge holder 35 faces the magnetic head device holding mechanism 110. The magnetic head device holding mechanism 110 holds the magnetic head device 5 at a given level relative to the signal recording surface of the optical disc 202 when the magnetic head device 5 is positioned in a recording position close to the optical disc 202. The magnetic head device holding mechanism is provided on an inner side edge of the sixth notch 127 of the notches 126, 127, and 128 to which the disc cartridge 201 is inserted so that the magnetic head device holding mechanism 110 projects inwardly of the notch 127. The magnetic head device holding mechanism 110 is made of an elastically displaceable leaf spring 111 having a tip end which is bent in a substantial U-shape. The apex of the U-shaped tip end of the leaf spring 111 is in slide contact with the engagement surface 23a provided with magnetic head lifting frame member 23 and biases the frame member 23 when the magnetic head device 5 is moved to the recording position close to the optical disc 202. The leaf spring 111 is secured to the eject plate 37 at the base end thereof by a screw 112.

One side edge 128a of the seventh notch 128 in the side of the insertion and removing opening for the disc cartridge 201 is brought into engagement with the rotary actuating engaging piece 72 projecting inwardly of the notch 128 for rotating the cartridge retracting actuating lever 57 when the eject plate 37 is slid to the eject position. An actuating portion 129, which an eject plate slide pin of the eject plate slide drive mechanism 38 for sliding the eject plate 37 to the eject position is engaged with and inserted into, is provided on the rear side of the seventh notch 128 into which the disc cartridge 201 is inserted. The actuating portion 129 is formed into a flat plate body which is substantially square in plan and is provided on a rear and side of the slide portion 117. The actuating portion 129 is formed with substantially circular pin sliding hole 129a which the eject plate slide pin 130 is engaged with and inserted through.

The eject plate slide mechanism 38 provided with the eject plate slide pin which is engaged with and inserted into the pin sliding hole 129a comprises an eject motor (not shown) disposed below the chassis base 6 and an eject plate actuating gear 131 provided with an eject plate slide pin 130 which is rotated by the motor. The eject motor is linked with an eject plate actuating gear 130 via a gear train 132 including a plurality of large and small gears. The eject plate actuating gear 131 is provided with the eject plate slide pin 130 in a position offset from the center of the gear 131 so that the pin 130 erects on the gear 131. The eject plate slide mechanic 38 is operated as follows: when an eject actuation button (not shown) is actuated to start the eject motor for rotating the eject plate actuation gear 131 on a condition that the disc cartridge 201 is loaded on the cartridge loading portion 1, the eject plate slide pin 130 is brought into slide contact and engagement with the peripheral edge of the pin slide hole 129a of the eject plate 37a. The slide pin 130 slides on the eject plate 37 to the eject position against a torsion coil spring 70 provided on the cartridge retracting actuation lever 57 and a tension coil spring disposed between the eject plate 37 and the chassis base 6, which will be described hereafter. The eject plate slide pin 130 is rotated to a position in which it will not be in slide contact with the pin slide hole 129a when the eject plate 37 is not in the eject position. The slide portion 117 is provided on the side edge of the insertion and removing opening for the disc cartridge 201 with a standing portion 133 formed by bending the edge of the slide portion upward and a bulged portion 134 in the rear of the standing portion 133.

The standing walls 118 and 119 provided on the opposite sides of the slide portion 117 are provided with vertically sliding slide grooves 135, 136 and 137, 38, respectively, for vertically moving the cartridge holder 35 with respect to the cartridge loading portion 1 and for moving the disc cartridge 201 to the eject position for the discharge thereof. The vertically moving slide grooves 135, 136 and 137, 138 comprise horizontal portions 135a, 136a which are in parallel with the insertion and removing direction of the disc cartridge 201; first inclined portions 135b, 136b and 137b, 138b gradually inclined toward the rear side from the horizontal portions 135a, 136a and 137a, 138a; and second inclined portions 135c, 136c and 137c, 138c sharply inclined downward toward the rear side. The cartridge holder 35, which is supported on the chassis base 6 by vertically moving guide pins 41, 42 and 43, 44 inserted through the thus formed vertically moving slide grooves 135, 136 and 137, 138, is moved in an axial direction of the spindle shaft 10 of the disc rotating device 2, that is, in a vertical direction relative to the cartridge loading portion 1 and moved to the eject position for ejecting the disc cartridge 201. Fourth tension coil springs 139 for normally biasing the eject plate 37 toward the insertion and removing opening for the disc cartridge 201 are provided on the standing walls 118 and 119 in the vicinity of the vertically moving slide grooves 136 and 138 in the side to which the disc cartridge 201 is inserted. One of the tension coil springs 139 is omitted for the sake of simplicity in the embodiment. Each of the tension coil springs 139 has one end which is engaged with the standing wall 118(119) and the other end which is engaged with a spring engaging pin 140(141) erected on the chassis base so that it normally biases the eject plate 37 toward the insertion and removing opening for the disc cartridge 1.

A lever actuating member 142 which is fitted into the lever actuating pin 34 of the lever 24 rotatably supported on the chassis base 6 for rotating the magnetic head lifting frame member, is provided in the inner side of the standing wall 118 to which the disclosure cartridge 201 is inserted. The lever actuating member 142 extends towards the other standing wall 119 from the side edge of the lower end of the standing wall 118 in a parallel relationship with the slide portion 117. The lever actuating member 142 is formed in the vicinity of the tip end thereof with an elongated lever actuating pin guide 142a into which the lever actuating pin 34 is inserted. The lever actuating pin 34 is inserted into and engaged with the lever actuating in guide groove 142a of the lever actuating member 142. The slide operation of the eject plate 37 causes the magnetic head lifting frame member vertically moving lever 24 to be rotated so that the magnetic head lifting frame member 23 is moved toward and away from the signal recording surface of the optical disc 202 in a direction substantially perpendicular thereto.

Referring now to FIGS. 5(A) to 10(C), loading operation of the above-mentioned disc cartridge 201 to the thus formed optical disc recording and/or reproducing apparatus will be described.

A condition before the disc cartridge 201 is loaded will now be described.

Figure 5A:
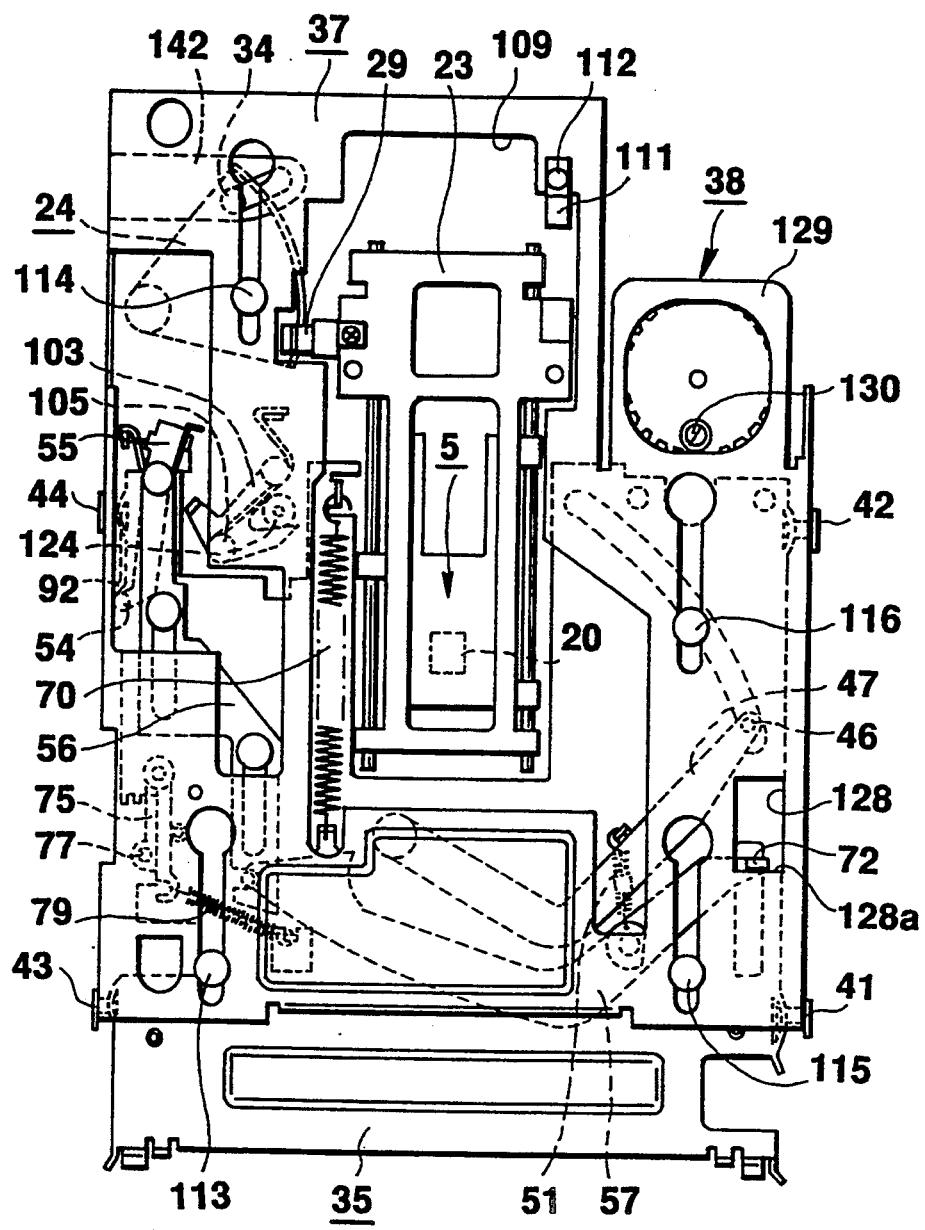
FIGS. 5(A) to 5(D) show the eject conditions of this apparatus.
Figure 5B:
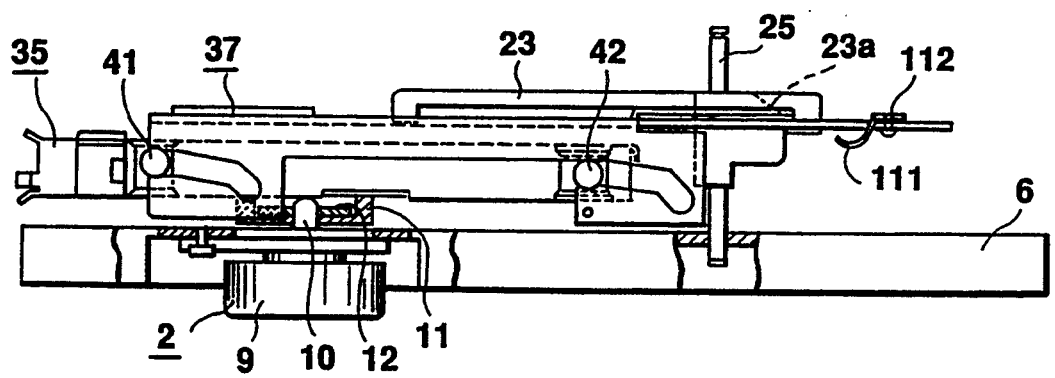

In order to load the disc cartridge 201, an eject button (not shown) is actuated to move the eject plate 37 to the eject position as shown in FIG. 5(A) and 5(B) for moving the magnetic head lifting frame member 23 on which the cartridge holder 35 and the magnetic head 20 are provided to an elevated position remote from the disc table 11 of the disc rotating drive device 2.

That is, by actuating the eject button, the eject plate slide mechanism is driven so that the eject plate slide pin 130 of the eject plate slide mechanism 38 is brought into a slide contact with the actuating portion provided on the eject plate 37. The eject plate 37 is slid to the disc cartridge 201 in an insertion direction against the fourth tension coil spring 139 between the eject plate 37 and the chassis base 6 and a tension coil spring 70 provided on the cartridge retracting actuation lever 57. The eject plate holding lever 103 of the cartridge holder support plate 36 is engaged with the eject plate engaging member 124 provided on the eject plate 37 so that the eject position of the eject plate 37 is held.

The rotary actuating engaging piece 72 of the cartridge retracting actuating lever 57 which projects into the seventh notch 128 of the eject plate 37 is retracted to the insertion side of the disc cartridge 201 in association with the slide operation of the eject plate 37. The cartridge retracting lever 56 linked with the cartridge retracting actuating lever 57 is conversely slid toward the disc cartridge 201 insertion and removing opening so that the cartridge retracting pin 54 of the cartridge retracting member 55 which is rotatably supported in the side of the tip end of the cartridge retracting lever 56 is brought into an abutment on the cartridge retracting pin restriction tongue 92 of the cartridge holder 35 for maintaining the cartridge retracting pin 54 to an outer position in which the pin will not abut on the disc cartridge 201 inserted into the cartridge holder 35.

Figure 5C:
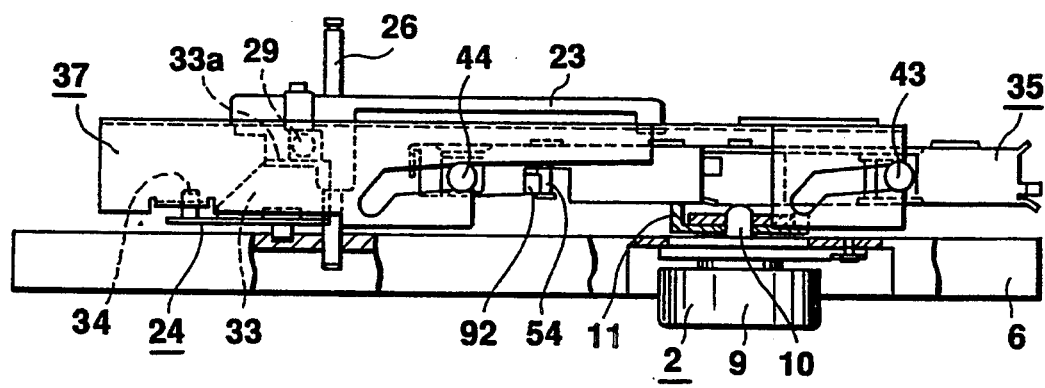
Figure 5D:
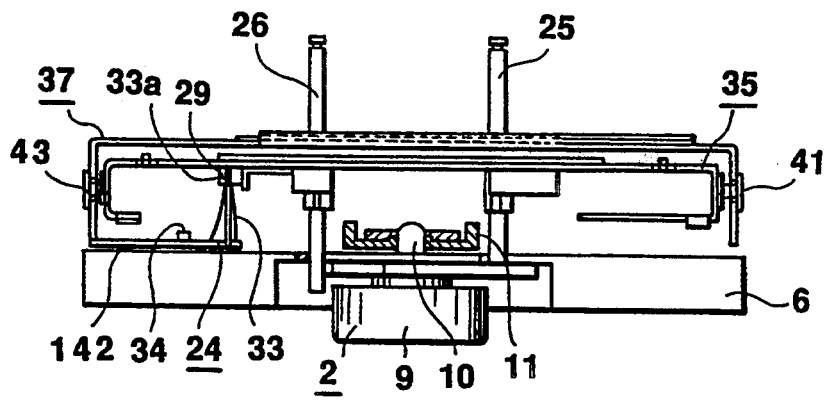

The shutter opening pin 46 is positioned in an initial position by the first tension coil 51 tensioned between the shutter opening lever 47 and the cartridge retracting actuating lever 57. On the other hand, the misinsertion preventing lever 77 is also positioned in such an initial position by the third tension coil spring 79 tensioned between the misinsertion preventing lever 75 and the cartridge holder 35 that the pin 77 depends downward into the cartridge holder 35. The lever actuating member 142 is brought into engagement with the lever 24 for rotating the lever 24 in association with the slide operation of the eject plate 37. The magnetic head lifting frame member 23 is moved to an elevated position remote from the disc table 11 of the disc rotary drive device 2 as shown in FIGS. 5(C) and 5(D). At this time, the magnetic head lifting frame member 23 has the engagement side 23a formed thereon which is biased by the leaf spring 111 formed on the eject plate 37 on the loading condition so that the magnetic head lifting frame member 23 is maintained in the recording position. When the eject plate 37 slides rearward to release the engagement, the magnetic head lifting frame member 23 is lifted against only the self weight. Accordingly, the load imposed upon the motor of the eject slide mechanism for lifting the magnetic head lifting frame member 23 may be low and a motor having a relatively low output power may be used.

When the magnetic head lifting frame member 23 is lifted to an elevated position, that is, the eject position, the lifting engaging pin 29 provided on the magnetic head lifting frame member 23, is brought into engagement with the parallel portion 33b of the vertically moving guide 33 of the magnetic head lifting frame member vertically moving lever 24. The magnetic head lifting frame member 23 is maintained in a position in which the magnetic head 20 will not abut on the disc cartridge 201 when the disc cartridge 201 is inserted.

On this condition, the disc cartridge 201 is inserted into the cartridge holder 35 from the side in which the shutter member 211 is provided.

When the disc cartridge 201 is inserted into the cartridge holder 35, the corner portion at the tip end side of the cartridge 203 is first brought into the misinsertion preventing pin 77 which is rotatably secured to the cartridge holder 35. If the disc cartridge 201 is inserted in a correct direction, the misinsertion preventing pin 77 is rotated in an outer direction represented by an arrow M in FIG. 6 by the disc cartridge 201 so that insertion of the disc cartridge 201 is permitted. If the disc cartridge 201 is inserted in a wrong direction into the cartridge holder 35, the disc cartridge 201 is prevented from being inserted by the misinsertion preventing pin 77.

Figure 6B:
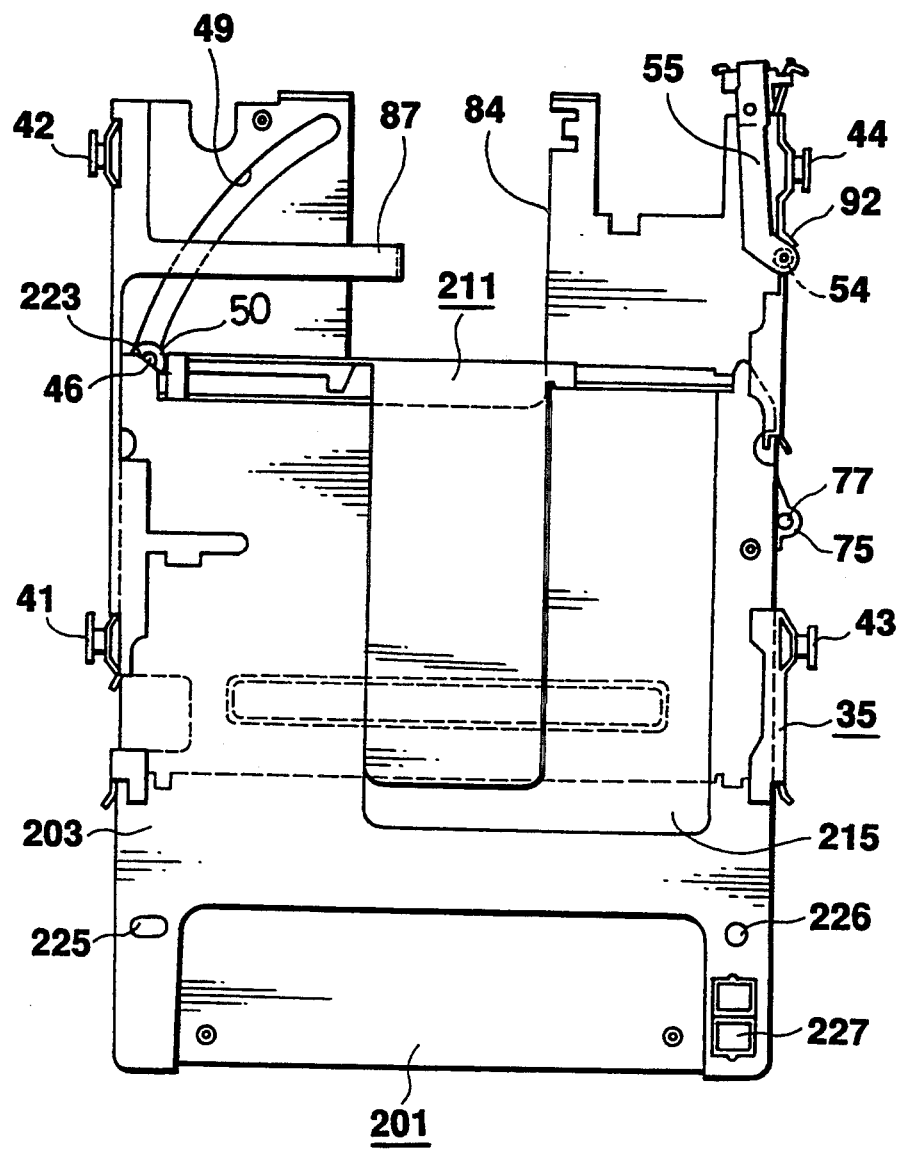
Figure 6C:
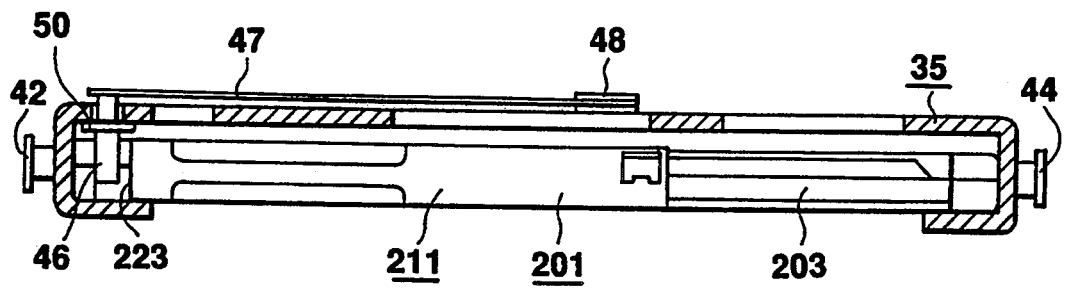
Figure 6D:
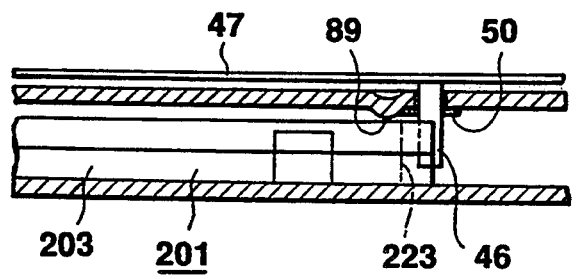
Figure 6F:
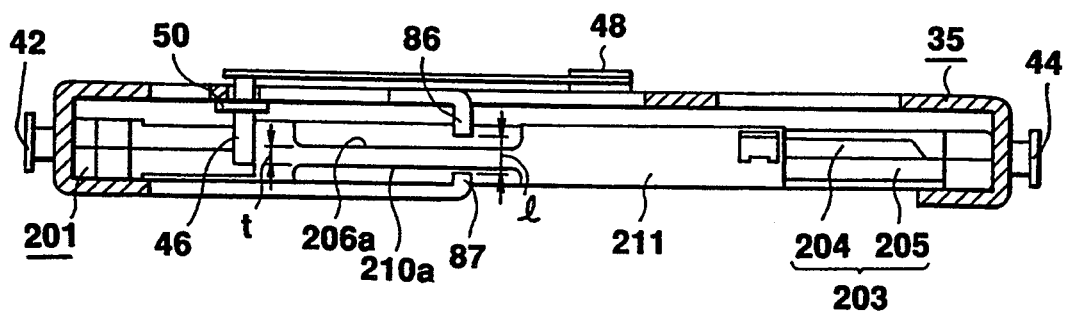
Figure 6:
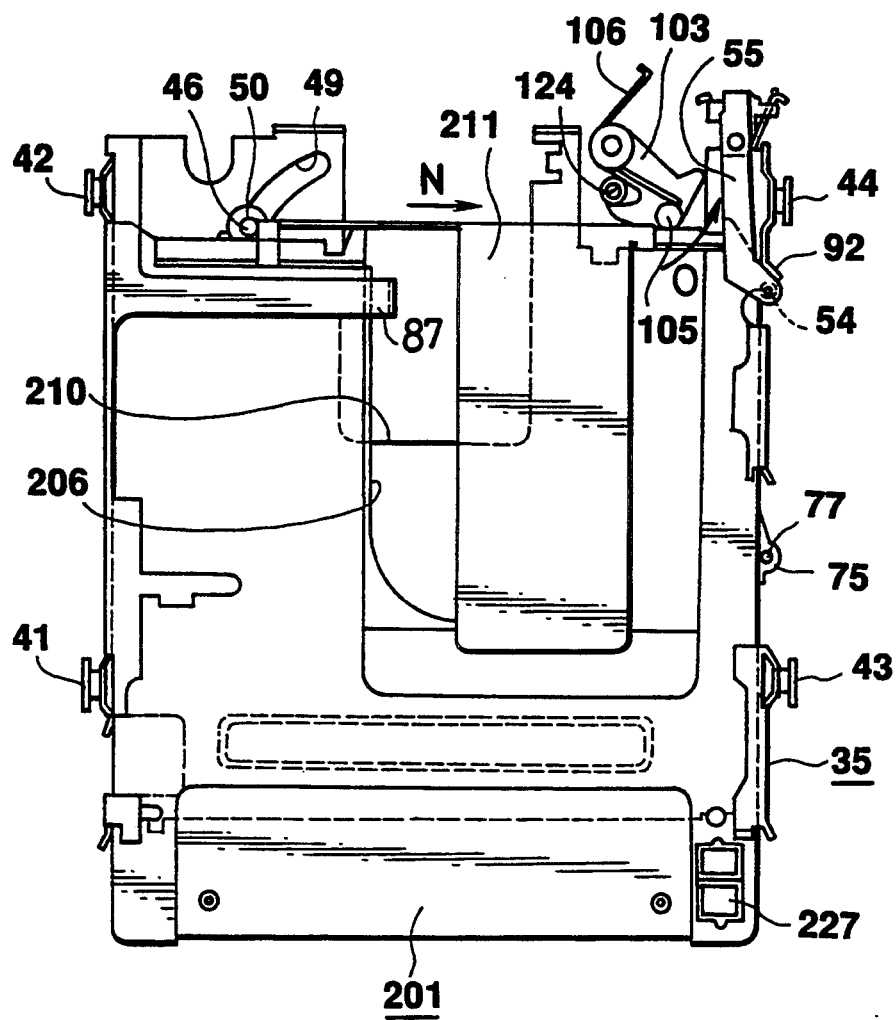
Figure 6G:
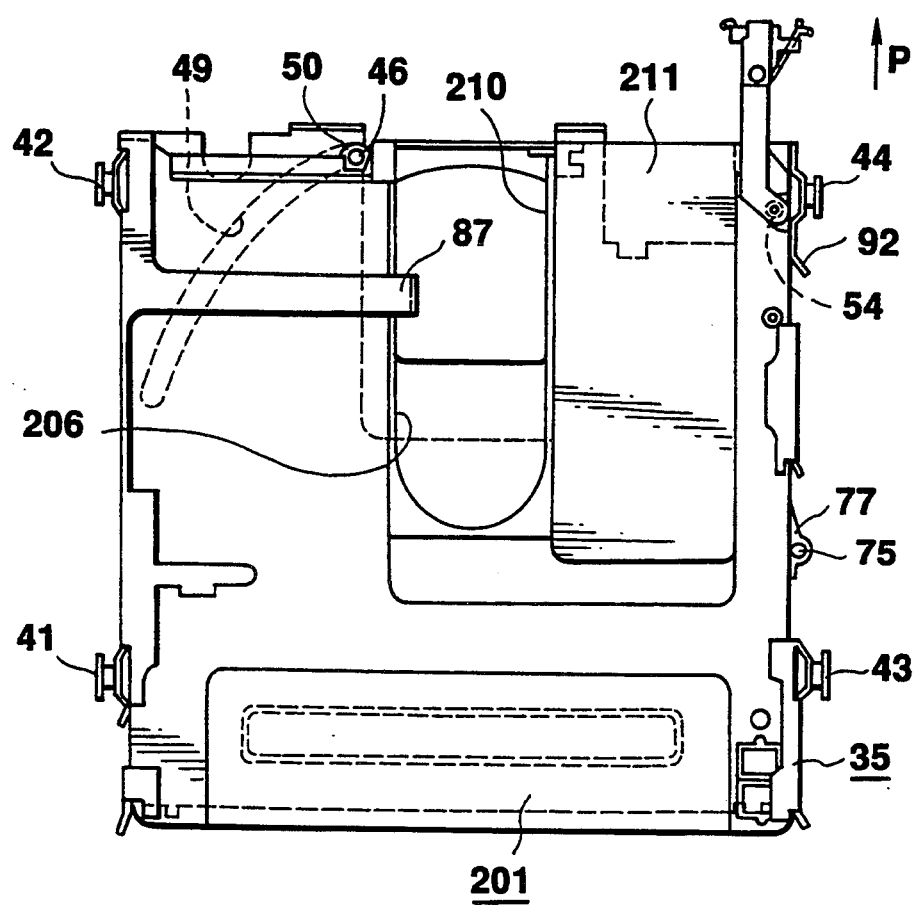

When the disc cartridge 201 is further inserted, the shutter opening pin 46 is adapted into the shutter opening member penetrating, recess 223 formed on the cartridge 203 so shown in FIGS. 6(B) and 6(C). At this time, the disc cartridge 201 is pushed downward toward the disc table 11 by the cartridge pushing down member 89 which is formed on the upper plate portion 45 of the cartridge holder 35 in opposite relationship with the shutter opening pin 46 as shown in FIG. 6(D) so that the disc cartridge 201 is prevented from riding on the shutter opening pin escapement preventing member 50 provided on the shutter opening pin 46.

If the disc cartridge 201 is further inserted into a cartridge holder 35 in this condition, the shutter member 211 is brought into abutment upon the shutter opening pin 46 at one end thereof as shown in FIG. 6(E). The shutter member 211 is moved by the shutter opening pin 46 against the biasing force of a torsional coil spring provided in the cartridge 203 in such a direction represented by an arrow N in FIG. 6(E) so that the openings 206a and 210 of the disc cartridge 201 are opened. Since the position of the shutter opening pin 46 relative to the shutter opening pin guide groove 49 is restricted by the shutter opening pin escapement preventing member 50, the shutter opening pin 46 positively opens the shutter member 211 without riding on the shutter member 211.

If the disc cartridge 201 is further inserted into the cartridge holder 35, the first and second tongues 86 and 87 of the cartridge holder 35 which extend downward toward the openings 206 and 210 of the disc cartridge 201 face the openings 206 and 210. Since the distance between the tip ends 86a and 87a of the first and second tongues 86 and 87 is larger than the thickness of the thin walled portion of the cartridge 203 defined by the notching recesses 206a and 210a formed on the upper and lower halves 204 and 205 of the cartridge 203, the disc cartridge 201 can be inserted without contact of the shutter member 211 with the tongues 86 and 87. In contrast to this, when a disc cartridge 229 which houses CD-ROM and the like having the notching recess 206a on only the lower half 205 as shown in FIG. 9 is inserted into the cartridge holder 35, the linking piece 214 of the shutter member 211 is brought into contact with the first tongue 86 so that insertion of the disc cartridge 229 is prevented. Determination whether or not the disc cartridge is loadable on the optical disc recording and/or reproducing apparatus is made depending upon whether the disc cartridge 206 abut, upon the first and second tongues 86 and 87.

If the disc cartridge 201 is further inserted into the cartridge holder 35 from this condition, the tip end of the disc cartridge 201 is brought into abutment upon the eject plate holding lever rotating pin 105 of the eject plate holding lever 103 rotatably mounted on the cartridge holder support plate 36. The eject plate holding lever 103 is rotated in a direction of an arrow O in FIG. 6 so that the engagement of the eject plate holding lever 103 with the eject plate engaging member 124 provided on the eject plate 37 is released. As a result of this, the eject plate 37 is unlocked so that the eject plate 37 is slid toward the insertion and removing opening for the disc cartridge 201 by the fourth tension coil spring 139 tensioned between the eject plate 37 and the chassis base 6. Simultaneously with this, engagement between the rotary actuating engaging piece 72 and the cartridge retracting actuation lever 57, which has been engaged with one side edge 128 of the notch 128 of the eject plate 37 as shown in FIG. 5(A), is released. This causes the cartridge retracting pin 54 which is held in an external position of the disc cartridge 201 to be adapted into and engaged with the cartridge retracting pin adapting hole 228 provided on the disc cartridge 201. The cartridge retracting actuating lever 57 is rotated by a second tension coil spring 70 tensioned between the cartridge retracting actuating lever 57 and the cartridge holder 35, so that the cartridge retracting lever 56, which is linked with the cartridge retracting actuating lever 57, is moved in an insertion direction of the disc cartridge 201. As a result of this, the cartridge retracting member 55 provided in the side of the tip end of the cartridge retracting lever 56 is biased by the second tension coil spring 70 tensioned between the cartridge retracting actuation lever 59 and the cartridge holder 35 to move the disc cartridge 201 in a disc cartridge insertion direction represented by an arrow P in FIG. 6. As a result of this, the disc cartridge 201 is positioned at the inner end of the cartridge holder 35 so that the first and second openings 206 and 210 provided on the disc cartridge 201 are fully opened.

The vertically moving guide pins 41, 42 and 137, 138 are guided along the vertically moving slide grooves 135, 136, and 137, 138, respectively, in association with the movement of the eject plate 37 so that the cartridge holder 35 is lowered in an axial direction of the spindle shaft of the disc rotary drive device 2. That is, the vertically moving guide pins 41, 42 and 43, 44 are guided along the vertically moving slide grooves 135, 136 and 137, 138, respectively, so that the cartridge holder 35 is lowered along the vertically moving guide grooves 95, 96, 97 and 98 provided on the cartridge holder support plate 36 while the guide pins 41, 42 and 43, 44 are engaged with the abruptly downwardly inclined second portions 135c, 136c and 137c, 138c of the vertically moving slide grooves 135, 136 and 137, 138, respectively. As a result of this, the disc cartridge 201 is positioned relative to the cartridge loading portion 1 and loaded thereon. The disc cartridge 201 at this time is restricted in position and maintained in a given level by the height positioning pins 7a, 8a and the disc cartridge positioning pins 7, 8 provided on the chassis base 6. Simultaneously with this, the optical disc 202 housed in the disc cartridge 201 is loaded on the disc table 11.

In association with the movement of the eject plate 37, the magnet head lifting frame member vertically moving actuating member 142 is then brought into engagement with the magnetic head lifting frame member vertically moving lever 24 to rotate the magnetic head lifting frame member vertically moving lever 24, and the magnetic head lifting frame member 23 is lowered in an axial direction of the spindle shaft 10 of the disc rotary driving device 2 shown in FIGS. 7(B) and 7(D). While the magnetic head lifting frame member 23 is lowered, the leaf spring 111 provided on the eject plate 37 is engaged with the engaging surface 23a of the magnetic head lifting frame member 23 to bias the frame member 23. As a result of this, the magnetic head 20 which is movably supported on the magnetic head lifting frame member 23 faces to the opening 210 of the disc cartridge 201 and is maintained at a given height position relative to the signal recording surface of the optical disc 202 housed in the disc cartridge 201 and is disposed in opposite relationship with the optical pickup device 4 so that recording and/or reproducing of informational signals is enabled.

Since the magnetic head lifting frame member 23 is biased by the leaf spring 111 provided on the eject plate 37 only when recording or reproducing of the informational signals on or from the optical disc 202 in the optical disc recording and/or reproducing apparatus which is formed as mentioned above, the magnetic head 20 is maintained at a given height position relative to the optical disc 202 even if thin apparatus is used while the optical disc 202 is not only horizontal relative to the horizontal surface, but also vertical.

Figure 10:
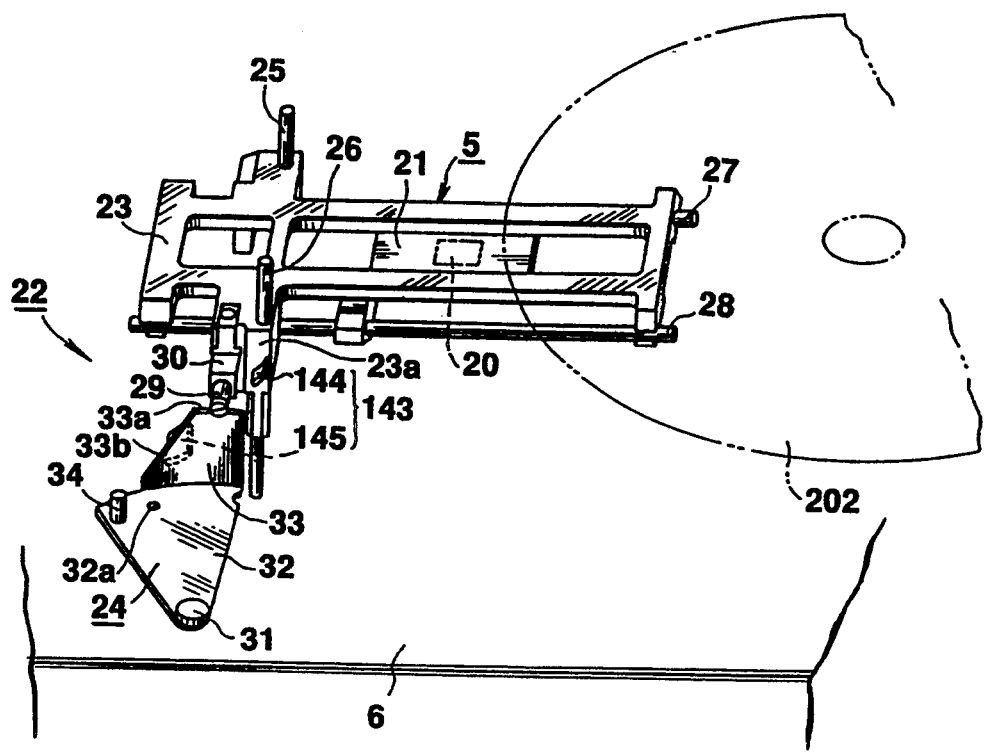
FIGS. 10(A) to 10(C) show another embodiment of a magnetic head device holding mechanism.
Figure 10:
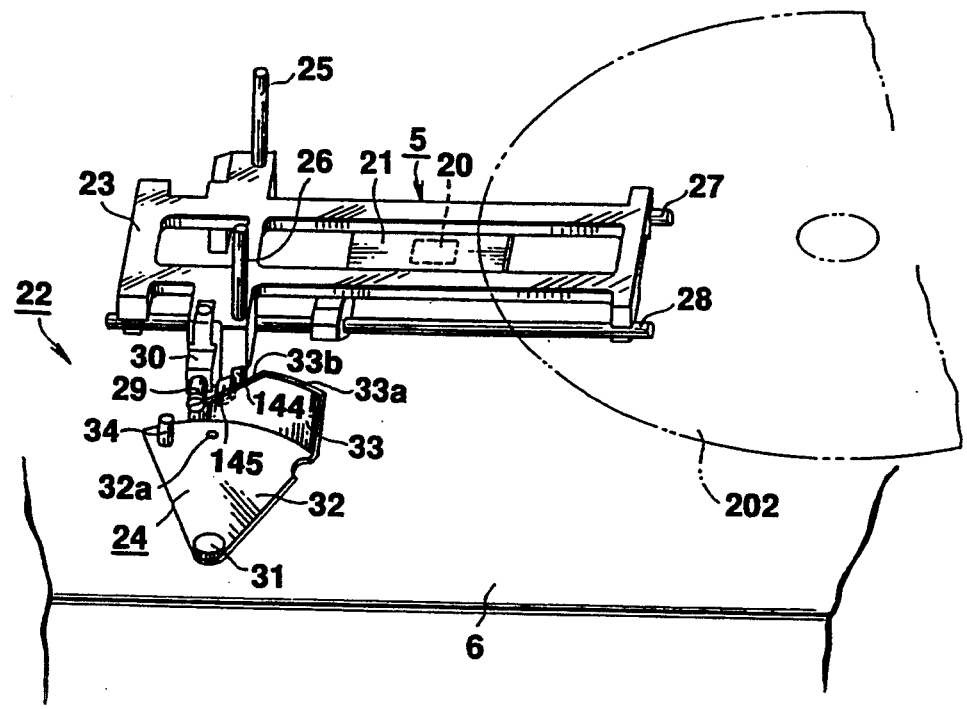
Figure 10C:
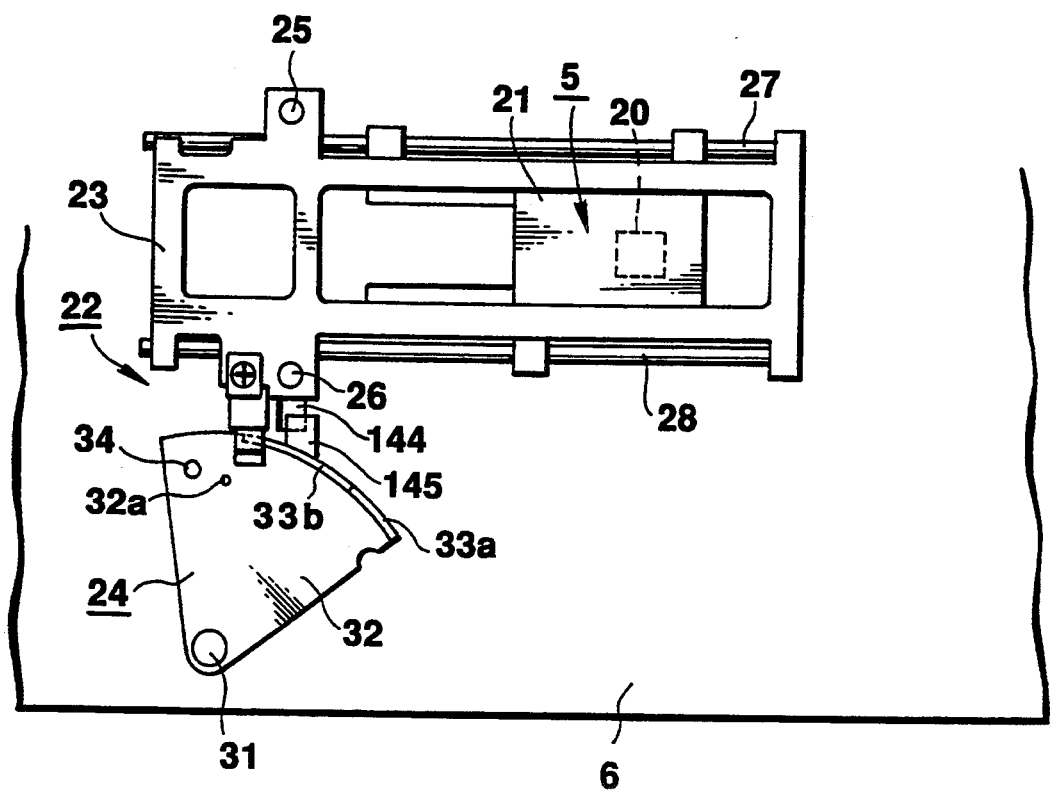

When the magnetic head 20 is disposed in the recording position close to the optical disc 202 in the optical disc recording and/or reproducing apparatus which is formed as mentioned above, the leaf spring 111 is used as the magnetic head device holding mechanism for holding the magnetic head 20 in a given height position relative to the signal recording surface of the optical disc 202. However, another magnetic head holding mechanism having a structure as shown in FIGS. 10(A) or FIG. 10(C) may be adopted.

The magnetic head device holding mechanism 143 comprises a first engaging piece 144 projecting toward the magnetic head lifting frame member vertically moving lever 24, which is provided on the side wall of the guide portion 23a of the magnetic head lifting frame member 23 for guiding one of the lifting shafts 26 and a second engaging piece 145 slidingly engaged with the first engaging piece 144, which projects on the outer wall of the vertically moving guide 33 of the magnetic head lifting frame member vertically moving lever 24 as shown in FIG. 1-8(A).

When the magnetic head lifting frame member 23 is in an eject position shown in FIG. 10(A), the first and second engaging pieces 144 and 145 are positioned in such positions that they do not overlap each other. When the magnetic head lifting frame member 23 is in a loading position as shown in FIG. 10(B), the second engaging piece 145 provided on the magnetic head lifting frame member vertically moving lever 24 lies upon the first engaging piece 144 provided on the magnetic head lifting frame member 23.

Adopting the thus formed magnetic head device holding mechanism 143 enables the magnetic head 20 to be maintained in a given height position relative to the signal recording surface of the optical disc 202 as is similar to the magnetic head device holding mechanism 110 in the former embodiment when the magnetic head 20 is moved to the recording position which is close to the optical disc 202. A large load will not be imposed to the motor for lifting the magnetic head lifting frame member 23.

What is claimed is:

1. A magneto-optical disc recording and/or reproducing apparatus comprising:
   a disc cartridge loading portion on which a disc cartridge housing an magneto-optical disc is loaded;
   a disc rotary drive means for rotating the magneto-optical disc;
   an optical pickup which is moved in a radial direction of the magneto-optical disc for recording and/or reproducing informational signals on and from the magneto-optical disc;
   magnetic field generating means which is disposed in a position opposite to the optical pickup with respect to the magneto-optical disc and is moved in a radial direction of the magneto-optical disc in synchronization with the movement of the optical pickup in a radial direction of the magneto-optical disc for recording informational signals on the magneto-optical disc together with the optical pickup;
   lifting means for moving the magnetic field generating means perpendicularly toward and away from the surface of the magneto-optical disc;
   loading means mechanically connected to the lifting means for loading the disc cartridge upon the cartridge loading portion and for loading the magneto-optic disc housed in the disc cartridge upon the disc rotary drive means, wherein the loading means causes the lifting means to move the magnetic field generating means from a position remote from the magneto-optical disc to a position closely adjacent to the magneto-optical disc in association with the loading operation of the disc cartridge upon the cartridge loading portion by the loading means.

2. A magneto-optical disc recording and/or reproducing apparatus as define in claim 1 in which the lifting means includes a member which is rotated by the loading means during a loading and an unloading operation of the disc cartridge upon and from the cartridge loading portion by the loading means, whereby the magnetic field generating means is moved toward and away from the magneto-optical disc by the member.

3. A magneto-optical disc recording and/or reproducing apparatus as defined in claim 2 in which the member which is rotated by the loading means and the lifting means comprises a flat plate having a rotary base end portion rotatably mounted on the cartridge loading portion and a standing wall portion perpendicularly extending from the rotary base portion with a cam portion for driving the magnetic field generating means toward and away from the magneto-optical disc on the side of the rotary base end portion.

4. A magneto-optical disc recording and/or reproducing apparatus as defined in claim 1 and further including holding means for holding the magnetic field generating means in such a position that the magnetic field generating means is at a given elevation relative to the magneto-optical disc when the magnetic field generating means is moved toward the magneto-optical disc by the lifting means.

* * * * *